United States Patent
Nilsson et al.

(10) Patent No.: US 12,332,614 B2
(45) Date of Patent: Jun. 17, 2025

(54) COMBINING RULE-BASED AND LEARNED SENSOR FUSION FOR AUTONOMOUS SYSTEMS AND APPLICATIONS

(71) Applicant: NVIDIA Corporation, Santa Clara, CA (US)

(72) Inventors: Hans Jonas Nilsson, Los Gatos, CA (US); Michael Cox, Menlo Park, CA (US); Sangmin Oh, San Jose, CA (US); Joachim Pehserl, Lynnwood, WA (US); Aidin Ehsanibenafati, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 592 days.

(21) Appl. No.: 17/698,695

(22) Filed: Mar. 18, 2022

(65) Prior Publication Data

US 2022/0297706 A1   Sep. 22, 2022

Related U.S. Application Data

(60) Provisional application No. 63/163,675, filed on Mar. 19, 2021.

(51) Int. Cl.
*G05B 13/02* (2006.01)
*G01S 13/86* (2006.01)
(Continued)

(52) U.S. Cl.
CPC .......... *G05B 13/027* (2013.01); *G01S 13/865* (2013.01); *G06V 10/80* (2022.01); *G06V 10/82* (2022.01); *B60W 2556/35* (2020.02)

(58) Field of Classification Search
CPC .... G05B 13/027; G01S 13/865; G06V 10/80; G06V 10/82; B60W 2556/35; B60W 40/00; B60W 50/04; B60W 60/00
See application file for complete search history.

(56) References Cited

U.S. PATENT DOCUMENTS 10,885,698 B2    1/2021  Muthler et al.
12,162,511 B2 *  12/2024  Sakamoto ................ G01S 7/40
(Continued)

FOREIGN PATENT DOCUMENTS

WO   2022/198084 A1   9/2022

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Fayyaz Alam
(74) *Attorney, Agent, or Firm* — Taylor English Duma L.L.P.

(57) ABSTRACT

In various examples, systems and methods are disclosed that perform sensor fusion using rule-based and learned processing methods to take advantage of the accuracy of learned approaches and the decomposition benefits of rule-based approaches for satisfying higher levels of safety requirements. For example, in-parallel and/or in-serial combinations of early rule-based sensor fusion, late rule-based sensor fusion, early learned sensor fusion, or late learned sensor fusion may be used to solve various safety goals associated with various required safety levels at a high level of accuracy and precision. In embodiments, learned sensor fusion may be used to make more conservative decisions than the rule-based sensor fusion (as determined using, e.g., severity (S), exposure (E), and controllability (C) (SEC) associated with a current safety goal), but the rule-based sensor fusion may be relied upon where the learned sensor fusion decision (Continued)

may be less conservative than the corresponding rule-based sensor fusion.

33 Claims, 17 Drawing Sheets

(51) Int. Cl.
    *G06V 10/80*     (2022.01)
    *G06V 10/82*     (2022.01)

(56) References Cited

U.S. PATENT DOCUMENTS

| | | | |
|---|---|---|---|
| 2008/0288425 A1* | 11/2008 | Posse | G06N 5/02 706/12 |
| 2019/0235515 A1* | 8/2019 | Shirvani | G05D 1/0221 |
| 2020/0242421 A1* | 7/2020 | Sobhany | B60W 50/08 |
| 2022/0126864 A1* | 4/2022 | Moustafa | B60W 60/0011 |
| 2025/0123605 A1 | 4/2025 | Nilsson et al. | |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
DO-178C, "Software Considerations in Airborne Systems and Equipment Certification", Retrieved from Internet URL: https://web.archive.org/web/202205 11073942/https://en.wikipedia.org/wiki/DO-178C 1/8, accessed on May 27, 2022, pp. 8.
EN 50128, "Safety-related railway software", Retrieved from Internet URL: https://web.archive.org/web/20210127231806/https://de.wikipedia.org/wiki/EN 50128, accessed on May 27, 2022, pp. 4.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
IEC 62061, "Safety of Machinery: Functional Safety of Electrical, Electronic And Programmable Electronic Control Systems" Retrieved from Internet URL : https://web.archive.org/web/20211228174407/https://en.wikipedia.org/wiki/IEC_62061, accessed on May 4, 2022, p. 1.
IEC 62304, "Medical Device Software" Retrieved from Internet URL: https://web.archive.org/web/20211217222309/https://en.wikipedia.org/wiki/IEC_62304, accessed on May 4, 2022, pp. 4.
ISO 10218, "Robots And Robotic Devices", International Standard For Industrial Robot Safety, Retrieved from Internet URL: https://web.archive.org/web/20211013041256/https://en.wikipedia.org/wiki/ISO_10218, accessed on May 4, 2022, pp. 2.
ISO 21448, "Road Vehicles—Safety of The Intended Functionality", International Organization for Standardization (ISO), Retrieved from Internet URL: https://web.archive.org/web/20210613214950/https://de. wikipedia.org/wiki/ISO/ PAS 21448, accessed on May 27, 2022, pp. 3.
International Search Report and Written Opinion for PCT Application No. PCT/US2022/021012, filed Mar. 18, 2022, mailed Jul. 12, 2022, 16 pgs.
Notification Concerning Availability of the Publication of the International Application for PCT Application No. PCT/US2022/021012, filed Mar. 18, 2022, mailed Sep. 22, 2022, 1 pg.
Quinonez, Raul et al: "SAVIOR: Securing Autonomous Vehicles with Robust Physical Invariants", Aug. 12, 2020, URL:https://www.usenix.org/system/files/sec20summer_quinonez_prepub.pdf, 18 pgs.
Nweke, Henry Friday et al: "Data fusion and multiple classifier systems for human activity detection and health monitoring: Review and open research directions", Information Fusion, Elsevier, US, vol. 46, Jun. 18, 2018, 24 pgs.
Lu, Jian Xian et al: "Fusion Technology of Radar and RGB Camera Sensors for Object Detection and Tracking and its Embedded System Implementation", Dec. 7, 2020, https://ieeexplore.ieee.org; 9 pgs.
Nilsson, Jonas; Notice of International Preliminary Report on Patentability for PCT Application No. PCT/US2022/021012, filed Mar. 18, 2022, mailed Sep. 28, 2023, 14 pgs.

\* cited by examiner

COMBINING RULE-BASED AND LEARNED SENSOR FUSION FOR AUTONOMOUS SYSTEMS AND APPLICATIONS

CROSS-REFERENCE TO RELATED APPLICATIONS

This application claims the benefit of U.S. Provisional Application No. 63/163,375, filed on Mar. 19, 2021, which is hereby incorporated by reference in its entirety.

BACKGROUND

For autonomous or semi-autonomous machines—e.g., land, sea, and air based vehicles, dynamic or static robots, etc.—being able to accurately perceive the environment in order to determine actions for controlling the machine within the environment is critical. In popular implementations, machines may employ various sensors—e.g., camera sensors, LiDAR sensors, RADAR sensors, touch sensors, temperature sensors, pressure sensors, microphones, ultrasonic sensors, etc.—to generate sensor data that may be processed to make sense of the perceived information. The processing may include detection (e.g., detecting objects), classification (e.g., classifying detected objects), tracking, another task, or a combination thereof. For example, a vehicle may detect other vehicles, pedestrians, intersections, wait conditions, etc., and/or may classify vehicles by type, intersections by type corresponding to associated wait conditions, etc. However, individual sensors may not accurately, precisely, or completely capture an environment within their field of view due to degraded interactions with the environment, sensor issues (e.g., camera flare, precipitation), oversaturation, noise, occlusion, etc. As another example, LiDAR sensors may generate noisy data due to unknown interactions of laser reflections with various surfaces having different surface reflectivity properties. To account for these issues, some sensors pre-process the raw sensor data to generate less noisy data that is more accurate than the raw data directly measured using the sensor. For example, pre-processing may include filtering over some number of pixels, applying white balance adjustments, generating a point cloud from LiDAR data, and/or applying three-dimensional (3D) or four-dimensional (4D) Fourier processing to raw sensing measurements from RADAR sensors. However, even with pre-processing, sensing devices may not completely overcome all of the inaccuracies that result from their own device physics, or inaccuracies that result from interactions with the surrounding environment.

To account for the inaccuracy of individual sensors, sensor fusion may be employed to perform processing of sensor data from two or more sensors. Sensor fusion may use a diversity of sensors or sensor types that collectively generate a set of diverse signals for processing into one or more fused signals. Two common approaches to sensor fusion processing include rule-based processing and learned processing. Rule-based processing may include Kalman filtering, unscented Kalman filtering, particle filtering, and/or other rule-based processing types, while learned processing may include the use of support vector machines (SVMs), deep neural networks (DNNs), and/or other learned processing types. These two approaches may be combined in series, such as by using computer vision algorithms to extract features from images and then applying the features to a learned detection and/or classification network. However, when combined in series in this way, the fusion mechanism may still rely on learned processing to generate a final fused result (and this combination may still be referred to as learned processing)—thus resulting in one or more common cause failures and reducing the safety level or integrity of the architecture. As such, rule-based or learned processing may be used for various tasks that employ sensor fusion—such as detection and/or classification tasks for an autonomous or semi-autonomous machine. However, for complex problems, conventional approaches may predominantly apply learned approaches due to their ability to generate more accurate results.

A potential issue with learned approaches, however, is the requirement that certain autonomous or semi-autonomous machine tasks satisfy certain safety classifications or levels, key performance indicators (KPIs), and/or safety goals to be in compliance with standards imposed by many national and international traffic authorities or governing agencies. For example, the safety of something that performs computations (e.g., hardware or software) may generally be classified into different levels, where use cases and hazards of the system may be analyzed following best practices in safety engineering to define a set of safety goals. Each safety goal may be assigned a level of "safeness" required, and the system may be analyzed to determine which components are implicated in the computation required to achieve the particular goal. Each component implicated may be assigned the requirement corresponding to the safety goal to which it contributes, and each component may be developed with sufficient rigor to meet the requirement, which entails rigorous specification, development, and testing. In some standards, for example, the levels of classification may be referred to as safety integrity levels. For example, in automotive engineering, an automotive safety integrity level (ASIL) is defined for sensing and computation devices in the international standard ISO 26262. Where ASIL is required, the safety requirements range from the least stringent and with the least assurance at ASIL A, to the most rigorous and with the greatest assurance at ASIL D. In safety engineering, there are—for many domains—generally reasonably rich rules to combine components developed at different safety integrity levels into a single component with higher integrity level. For example, an ASIL B component may be combined or fused with another ASIL B component to achieve ASIL D (e.g., ASIL D=ASIL B(D)+ASIL B(D)), and the process of combining two independent components together may be referred to as ASIL decomposition. In examples where two or more components work together to achieve a higher ASIL, there must be supporting analysis and evidence that can be produced to demonstrate that the components are sufficiently free from common cause failures that would lead to a coupled failure, particularly where a failure of indeterminate cause results.

In addition to or alternatively from safety integrity levels, certain safety standards may include accuracy requirements for intended functions or safety goals of the machine. For example, in ISO 21448, accuracy or performance requirements may be included in the criteria for satisfying safety standards. In some examples, where the safety integrity level is high, the performance or accuracy requirement may also be high. For example, an ASIL D requirement may also include an accuracy requirement that permits no more than one failure in $10^8$ hours of usage to be in compliance. As an example, a first component having a first accuracy or performance level (e.g., failure every $10^4$ hours) may be combined or fused with another component having a second accuracy or performance level (e.g., failure of $10^4$ hours) such that the two outputs when used together, may have a failure of $10^8$ hours.

Where learned approaches are used for sensor fusion, decomposition of the individual sensor inputs and their impact on the computation may not be possible, or may not be understood well enough to comply with higher levels of safety—such as ASIL D in automotive applications—and/or to satisfy various KPIs or accuracy requirements. For example, ensuring that a common cause failure is not carried through the learned processing of fused sensor data is a challenging task, and one that may not be currently trusted by various regulating bodies, companies enforcing ISO standards, and/or the like. This may be a result of deep learning architectures—e.g., DNNs—conflating the sensor data from the various sensor inputs in such a way that determining given contributions of individual sensors is not possible, or feasible. As another example, high accuracy or performance levels may face the same problem with learned fusion as does ASIL in that it is challenging or not feasible to decompose these high accuracy or performance requirements over learned fusion.

As such, conventional approaches for higher levels of safety may employ rule-based processing—where decomposition of various sensor inputs is more well understood—in order to perform sensor fusion in a way that satisfies standards with respect to higher levels of safety or KPIs. However, rule-based processing alone may not be as accurate, lean, or efficient as learned processing methods, and thus the effort to satisfy higher safety standards may come at the expense of accuracy.

SUMMARY

Embodiments of the present disclosure relate to approaches that combine both rule-based sensor fusion and learned sensor fusion for autonomous machine systems and applications. Systems and methods are disclosed that perform sensor fusion using rule-based and learned processing methods to take advantage of the accuracy of learned approaches and the decomposition benefits of rule-based approaches for satisfying higher levels of safety requirements, accuracy, and/or performance. For example, combined learned and rule-based architectures described herein may retain at least one processing pipeline or stream for each of a plurality of sensors such that individual outputs are computed using a single source of sensor data. These individual outputs may then be processed using at least a rule-based fusion mechanism, such that higher level safety requirements or KPIs (e.g., performance and/or accuracy) may be satisfied due to the removal of common cause failures and/or the accuracy requirements being shared among the various inputs, while also using learned fusion approaches to provide a hint or additional input for the rule-based fusion mechanism to increase the accuracy or precision of the final fused output. As such, and in contrast to conventional systems that rely on rule-based sensor fusion alone to satisfy safety requirements, or that use learned sensor fusion alone to satisfy lower levels of safety, accuracy, or performance, the present system and methods may use both learned sensor fusion and rule-based sensor fusion techniques that take advantage of the benefits of each approach in an efficient design.

For example, in-parallel and/or in-serial combinations of early rule-base sensor fusion, late rule-based sensor fusion, early learned sensor fusion, or late learned sensor fusion may be used to solve various safety goals associated with various required safety levels at a high level of accuracy and precision. Early fusion may use sensor data directly—e.g., before or after post-processing—to fuse the sensor data signals into one or more fused signals, while late fusion may use rule-based or learned outputs computed using sensor data signals to generate an updated or more complete output representation. As a result, depending on the safety goal or task at hand—e.g., detecting pedestrians (higher safety standards) or detecting small road debris (lower safety standards)—a combination of early or late rule-based and learned sensor fusion may be used to achieve the most reliable, accurate, and safe outputs. Further, in some embodiments, a monitor architecture may be used, where outputs of learned sensor fusion and rule-based sensor fusion may be separately computed, and then analyzed by an arbiter or decision making component to determine which output to act on—e.g., in view of one or more safety rules or goals. In such an example, the learned outputs may be used as an input (e.g., a hint or weighting) for the arbiter to aid in the decision making process, while still maintaining required level of safety, accuracy, and performance and avoiding common cause failures. In at least one embodiment, a disjoint safety goal architecture may be used, where outputs of rule-based fusion correspond to a first output type and are used to satisfy a first safety standard, a first performance requirement(s), and/or a first accuracy requirement(s), and outputs of learned fusion correspond to a second output type and are used to satisfy a second safety standard, a second performance requirement(s), and/or a second accuracy requirement(s) (e.g., at a lower integrity level, performance level, and/or accuracy level than the first safety standard and/or first requirements). In such an example, rule-based and learned processing may be performed on the same sensor data signals or processed outputs, such that the same fusion data may be used to compute various different outputs.

In some embodiments, the rule-based fusion pipelines may be used as a fallback or safety net to satisfy various requirements or KPIs associated with higher safety levels, while using the learned sensor fusion as a primary driver of the decision making process. For example, where a high level (e.g., ASIL D) safety requirement is that all pedestrians within 30 meters of an ego-machine must be detected, the rule-based fusion output may be relied upon where there is disagreement between the learned and rule-based outputs such that the safety requirements are complied with, but beyond 30 meters or when there is agreement, the signal from the learned sensor fusion may be relied upon for making decisions. As a result, the system may be designed to comply with higher levels of safety, performance, and/or accuracy, but may rely on or take advantage of the accuracy or precision of the learned sensor fusion wherever doing so would not compromise compliance with the associated safety requirements or KPIs. Thus, in non-limiting embodiments, the learned sensor fusion may be used to make more conservative decisions than the rule-based sensor fusion (as determined using, e.g., severity (S), exposure (E), and controllability (C) (SEC) of hazardous events associated with a current safety goal), but the rule-based sensor fusion may be relied upon where the learned sensor fusion decision may be less conservative than the corresponding rule-based sensor fusion.

BRIEF DESCRIPTION OF THE DRAWINGS

The present systems and methods for combined rule-based sensor fusion and learned sensor fusion for autonomous machine systems and applications are described in detail below with reference to the attached drawing figures, wherein.

DETAILED DESCRIPTION

Figure 1:
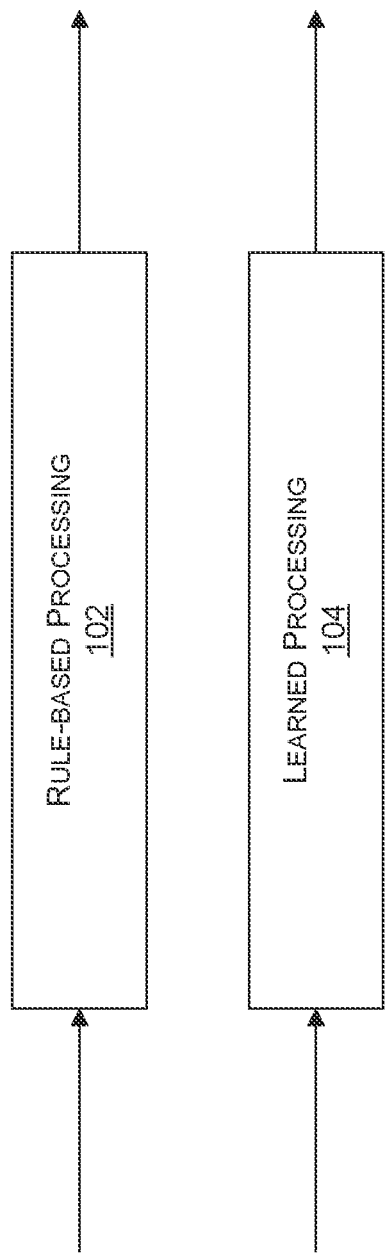
FIG. 1 illustrates a data flow diagram corresponding to rule-based processing and learned processing, in accordance with some embodiments of the present disclosure.

Systems and methods are disclosed related to combining rule-based and learned sensor fusion for autonomous machine applications. Although the present disclosure may be described with respect to an example autonomous vehicle 1500 (alternatively referred to herein as "vehicle 1500," "ego-machine 1500," or "ego-vehicle 1500," an example of which is described with respect to FIGS. 15A-15D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, manufacturing, construction, or warehouse equipment or robots, electric or motorized bicycles, aircraft, construction vehicles, underwater craft, rail transport, drones, space vehicles, and/or other vehicle types. In addition, although the present disclosure may be described primarily with respect to autonomous or semi-autonomous driving, this is not intended to be limiting, and the systems and methods described herein may be used in augmented reality, virtual reality, mixed reality, robotics, automation, construction, avionics, warehouse or factory systems, security and surveillance, autonomous or semi-autonomous machine applications or systems, and/or any other technology spaces where sensor fusion may be used. In addition, although ISO 26262 requirements for automotive systems may be primarily described herein, this is not intended to be limiting, and other requirements may be used without departing from the scope of the present disclosure—e.g., ISO 21448 for road vehicles and the safety of intended functionality, IEC 61508 for safety systems, ISO 10218 for robots and robotic devices, EN 50128 for railway applications, IEC 62304 for medical devices, IEC 62061 for machinery system design, DO-178C for software considerations in airborne systems and equipment certification, etc. In addition, although detection and/or classification algorithms or networks are primarily described herein, this is not intended to be limiting, and different algorithm or network types may be used depending on the embodiment. For example, tracking algorithms or networks, trajectory or path prediction algorithms or networks, and/or other algorithm or network types may be used.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to the figures illustrated and described herein, it should be understood that these and other arrangements are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, at least some of the features, functionality, and/or components described with respect to FIGS. 1-12 may be executed using similar features, functionality, and/or components to those described with respect to ego-vehicle 1500 of FIGS. 15A-15D, example computing device 1600 described with respect to FIG. 16, and/or example data center 1700 described with respect to FIG. 17.

The processes of executing the systems and architectures described herein may include generating and/or receiving sensor data from one or more sources (e.g., sensors of a vehicle 1500, a robot, a VR, AR, or mixed reality system, a medical imaging device, a robot, an autonomous machine, a train, a boat, a plane, and/or another source type). The sensor data may be used to perform any number of operations—e.g., object detection, classification, and/or tracking, path planning, control operations, intersection structure detection, road layout determinations, mapping and localization, etc. The sensor data may include real-world data, simulated sensor data (e.g., sensor data generated using one or more virtual sensors of a virtual vehicle in a virtual environment), augmented sensor data (e.g., sensor data generated using one or more data collection vehicles and modified with virtual data, respectively), and/or other sensor data types.

Figure 15A:
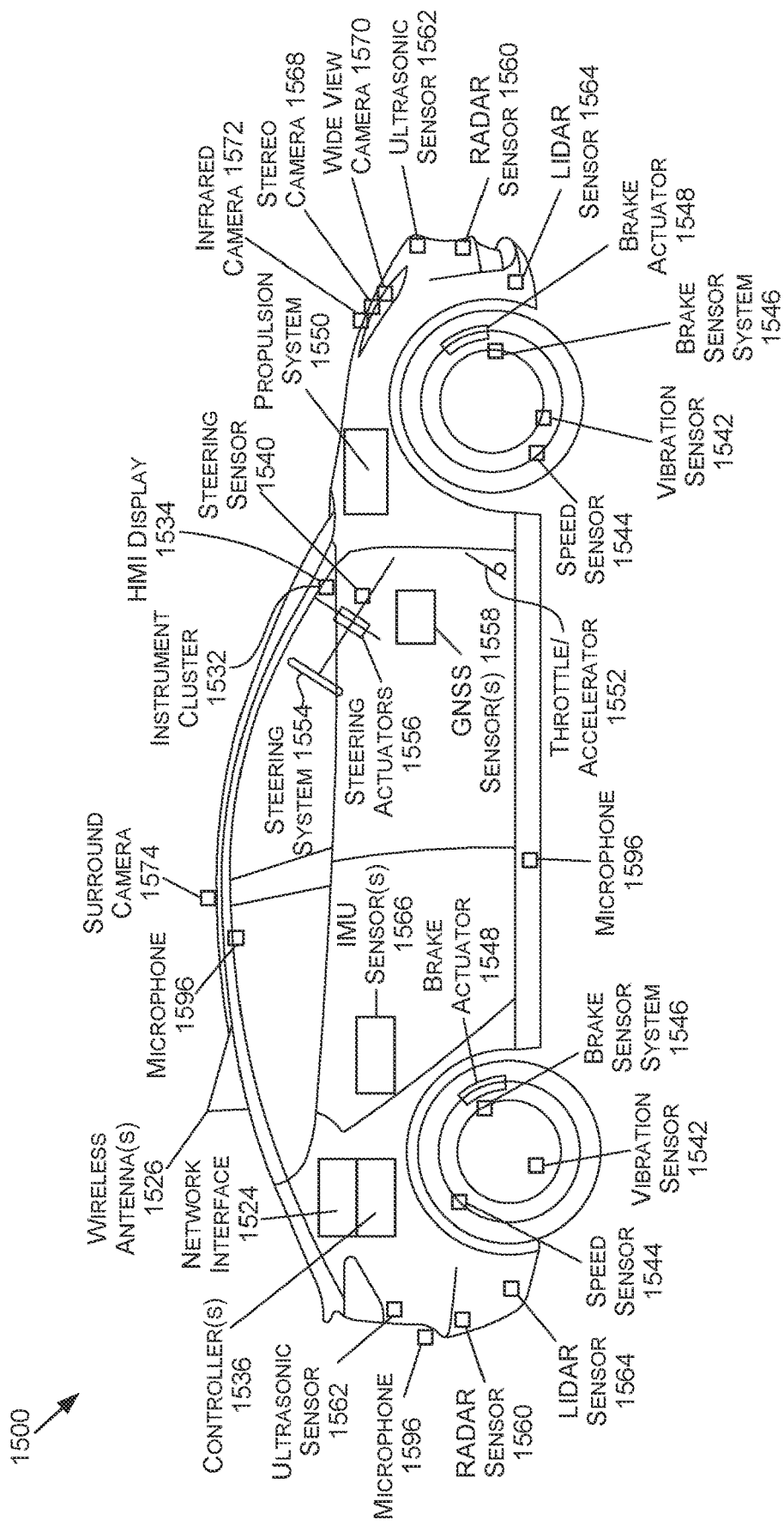
FIG. 15A is an illustration of an example autonomous vehicle, in accordance with some embodiments of the present disclosure.
Figure 15B:
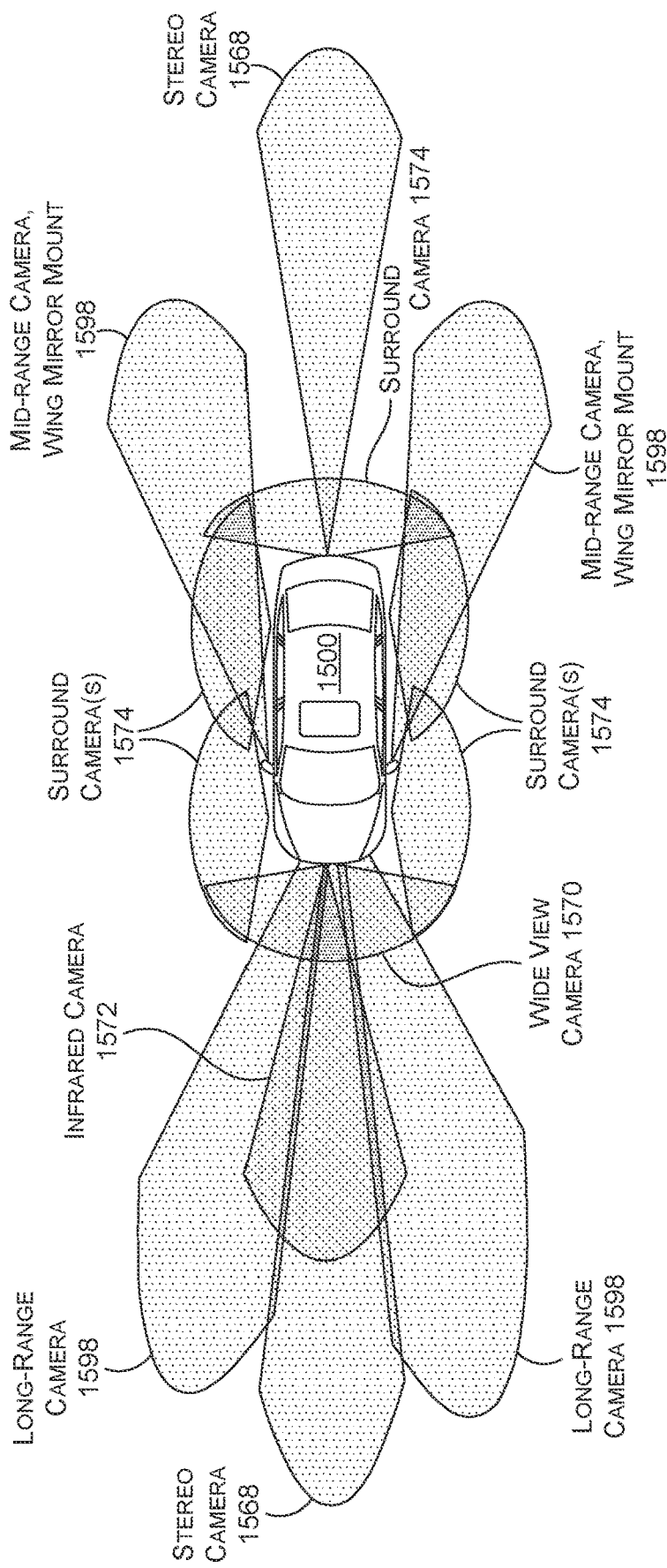
FIG. 15B is an example of camera locations and fields of view for the example autonomous vehicle of FIG. 15A, in accordance with some embodiments of the present disclosure.
Figure 15C:
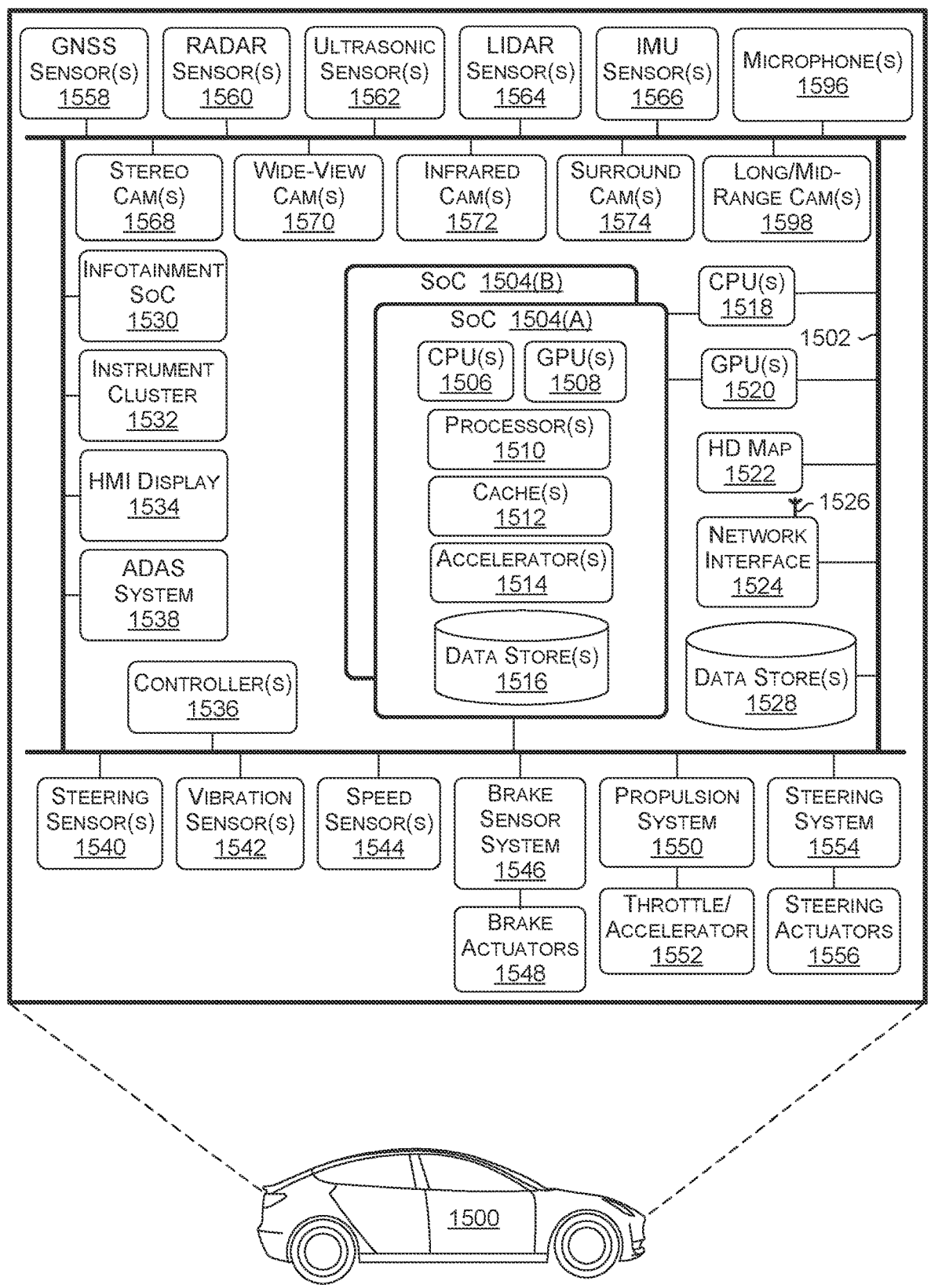
FIG. 15C is a block diagram of an example system architecture for the example autonomous vehicle of FIG. 15A, in accordance with some embodiments of the present disclosure.

As such, the sensor data may include, without limitation, sensor data from any of the sensors of the ego-machine 1500 including, for example and with reference to FIGS. 15A-15C, RADAR sensor(s) 1560, ultrasonic sensor(s) 1562, LIDAR sensor(s) 1564, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1578, microphones 1596, INU sensors 1566, GNSS sensors 1558, speed sensors 1544, thermal cameras or sensors, and/or other sensor types. As another example, the sensor data may include virtual (e.g., simulated or augmented) sensor data generated from any number of sensors of a virtual vehicle or other virtual object or machine in a virtual (e.g., testing) environment. In such an example, the virtual sensors may correspond to a virtual vehicle or other virtual object in a simulated environment (e.g., used for testing, training, and/or validating DNN performance), and the virtual sensor data may represent sensor data captured by the virtual sensors within the simulated or virtual environment.

In some embodiments, the sensor data may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data may be used without any pre-processing (e.g., in a raw or captured format), while in other examples, the sensor data may undergo pre-processing (e.g., noise balancing, demosaicing, scaling, cropping, augmentation, white balancing, tone curve adjustment, etc., such as using a sensor data pre-processor (not shown)). As used herein, the sensor data may reference unprocessed sensor data, pre-processed sensor data, or a combination thereof.

In addition, detect/classify components, learned processing components, learned sensor fusion components, and/or other components described herein may, in non-limiting embodiments, include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Sensor fusion may be used to account for sensor errors of various sensor modalities, and to take advantage of the various benefits of different sensor modalities. For example, where a LiDAR sensor may be helpful for detecting depth of objects, image sensors may be helpful for identifying appearances of objects. Similarly, a LiDAR sensor may include noisy or sparse data, and an image sensor may generate more dense data. As such, by combining outputs—or detections based on outputs—of various sensor modalities (or a plurality of sensors of a same modality with different fields of view or sensory fields) through sensor fusion, the accuracy or precision of the fused output may exceed that of the individual sensor contributions. Sensor fusion may be executed using rule-based processing 102 (e.g., Kalman filtering, unscented Kalman filtering, particle filtering, etc.) or learned processing 104 (e.g., using deep neural networks (DNNs), support vector machines (SVMs), etc.), as illustrated in FIG. 1.

These two approaches may be combined in series, for example, as done in computer vision algorithms that extract features from sensor output and then apply detection and/or classification using, e.g., a DNN. However, these hybrid architectures are still considered learned, as at least one learning component is present in the processing pipeline. Rule-based processing 102 and learned processing 104 may be employed in detection, classification, and/or other tasks (e.g., tracking), but are often reserved for complex problems.

Combining the ideas of safety with rule-based processing 102 vs. learned processing 104, there may be various basic architectures that may be used for sensor fusion. For example, late rule-based sensor fusion (LRSF), late learned sensor fusion (LLSF), early rule-based sensor fusion (ERSF), and/or early learned sensor fusion (ELSF) may be used. Due to the safety integrity levels and associated KPIs—e.g., such as those defined in ISO 26262, including ASIL A-D, or ISO 21448—using learned sensor fusion or rule-based sensor fusion may result in outputs that satisfy different potential safety levels, accuracy requirements, and/or performance requirements. For a non-limiting example, to achieve ASIL D, safety decomposition may be used to generate two or more separate signals—with verifiably no common cause failures—that each satisfy ASIL B(D), such that the cumulative output may satisfy ASIL D standards. Similarly, although not illustrated, decomposition may be used to spread accuracy and/or performance requirements across two or more pipelines or streams. For example, if an accuracy or performance requirement is less than one failure per 10^8 hours, then two or more pipelines having accuracy or performance levels that are, e.g., the square root of 10^8, so 10^4, may be used to satisfy the requirement of 10^8. As such, even though primarily described herein with respect to decomposing ASIL requirements across two or more sensor processing pipelines, this is not intended to be limiting, and accuracy or performance requirements may similarly be decomposed across two or more pipelines.

Figure 2:
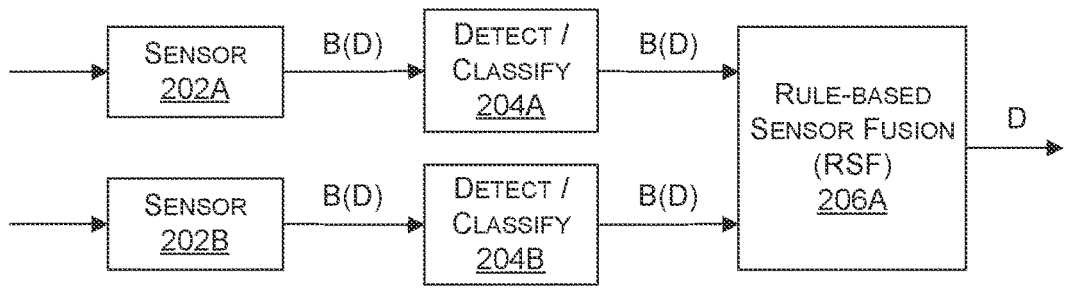
FIGS. 2-5 illustrate data flow diagrams corresponding to rule-based processing or learned processing, in accordance with some embodiments of the present disclosure.
Figure 3:
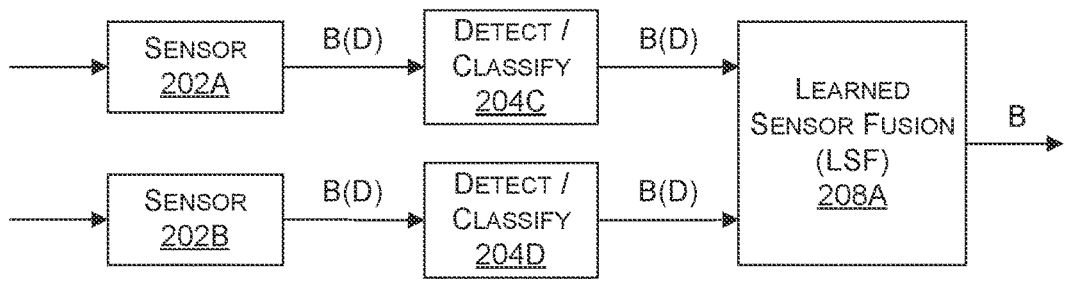
Figure 4:
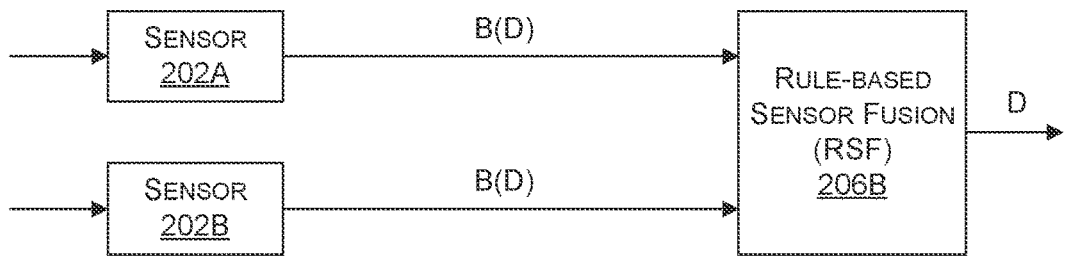
Figure 5:
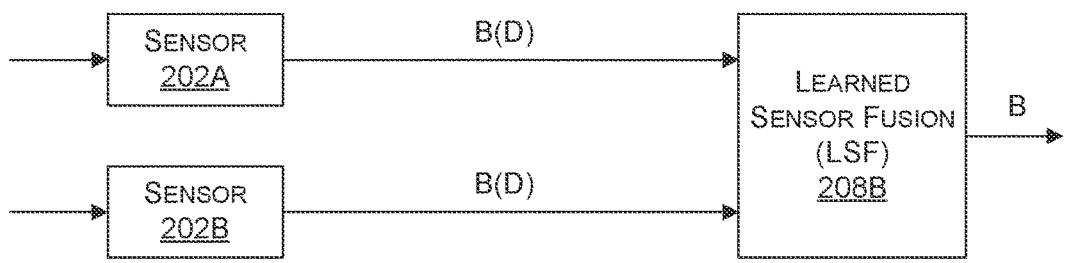

FIGS. 2-5 illustrate the various example architectures for rule-based sensor fusion and learned sensor fusion, such as those described above (e.g., LRSF, LLSF, ERSF, and ELSF). Early sensor fusion (e.g., as illustrated in FIGS. 4 and 5) may correspond to, e.g., fusing together raw and/or pre-processed sensor signals from two or more sensors to generate detections and/or classification. For example, a RADAR sensor may generate RADAR data and a LiDAR sensor may generate LiDAR data, and the RADAR data and the LiDAR data may be processed by a detection and/or classification algorithm to generate one or more detections. Late sensor fusion (e.g., as illustrated in FIGS. 2 and 3) may correspond to fusing together detections from two or more detection and/or classification algorithms—e.g., rule-based or learned processing components, such as DNNs, Kalman filters, etc.—to generate fused detections. For example, a first detection/classification algorithm may generate a first output and a second detection/classification algorithm may generate a second output, and the first output and the second output may be processed to generate a third, fused output.

For example, FIG. 2 may correspond to late rule-based sensor fusion (LRSF), where sensor 202A may generate sensor data at an ASIL level of B(D), a first detection and/or classification network 204A may process the sensor data to generate first outputs at ASIL B(D), sensor 202B may generate sensor data at an ASIL level of B(D), a second detection and/or classification network 204B may process the sensor data to generate second outputs at ASIL B(D), and rule-based sensor fusion (RSF) 206A may be executed to generate an ASIL D fused output. Because the sensor 202A pipeline and the sensor 202B pipeline are separate—e.g., would not share common cause failures—and the fusion mechanism is rule-based (where safety decomposition may more easily be employed), the output of the rule-based sensor fusion processing may be at ASIL D.

As another example, FIG. 3 may correspond to late learned sensor fusion (LLSF), where sensor 202A may generate sensor data at an ASIL level of B(D), a first detection and/or classification network 204C may process the sensor data to generate first outputs at ASIL B(D), sensor 202B may generate sensor data at an ASIL level of B(D), a second detection and/or classification network 204D may process the sensor data to generate second outputs at ASIL B(D), and learned sensor fusion (LSF) 208A may be executed to generate an ASIL B fused output. In such an example, because learned sensor fusion may not by itself be capable of achieving a higher or maximum integrity level, learned sensor fusion may be used to achieve, for example, at most ASIL B compliance. This may be a result of the challenge of analyzing and identifying internal failures of learned algorithms, models, or networks (e.g., DNNs), so a learned processing component may not be capable of achieving a higher safety integrity level than the lowest safety integrity level over its inputs. As such, in the example of FIG. 3, both sensor inputs are B(D), and so the learned fusion component 208A cannot achieve greater than ASIL B for its output.

With respect to FIG. 4, FIG. 4 may correspond to early rule-based sensor fusion (ERSF), where sensor 202A may generate sensor data at an ASIL level of B(D), sensor 202B may generate sensor data at ASIL B(D), and rule-based sensor fusion (RSF) 206B may be executed on both the input sensor signals to generate an ASIL D fused output. Because sensor 202A and sensor 202B are separate—e.g., would not share common cause failures—and the fusion mechanism is rule-based, the output of the rule-based sensor fusion processing may be at ASIL D.

As another example, FIG. 5 may correspond to early learned sensor fusion (ELSF), where sensor 202A may generate sensor data at an ASIL level of B(D), sensor 202B may generate sensor data at an ASIL level of B(D), and learned sensor fusion (LSF) 208B may be executed to generate an ASIL B fused output. In such an example, because learned sensor fusion may not by itself be capable of achieving a higher or maximum integrity level, learned sensor fusion may be used to achieve, for example, at most ASIL B compliance—e.g., corresponding to a lowest ASIL level of the input sensor signals.

Figure 8:
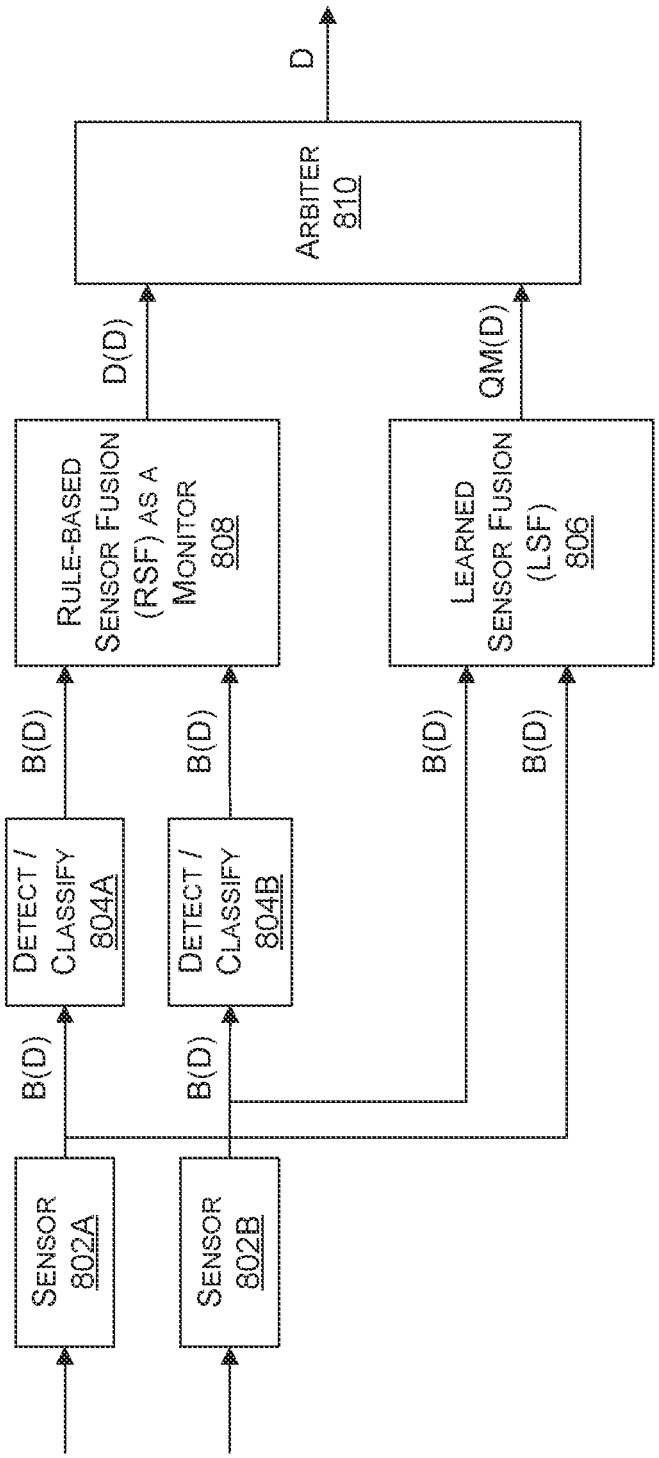
FIGS. 8-9 illustrate data flow diagrams corresponding to selecting a rule-based fusion output or a learned fusion output using an arbiter, in accordance with some embodiments of the present disclosure.
Figure 9:
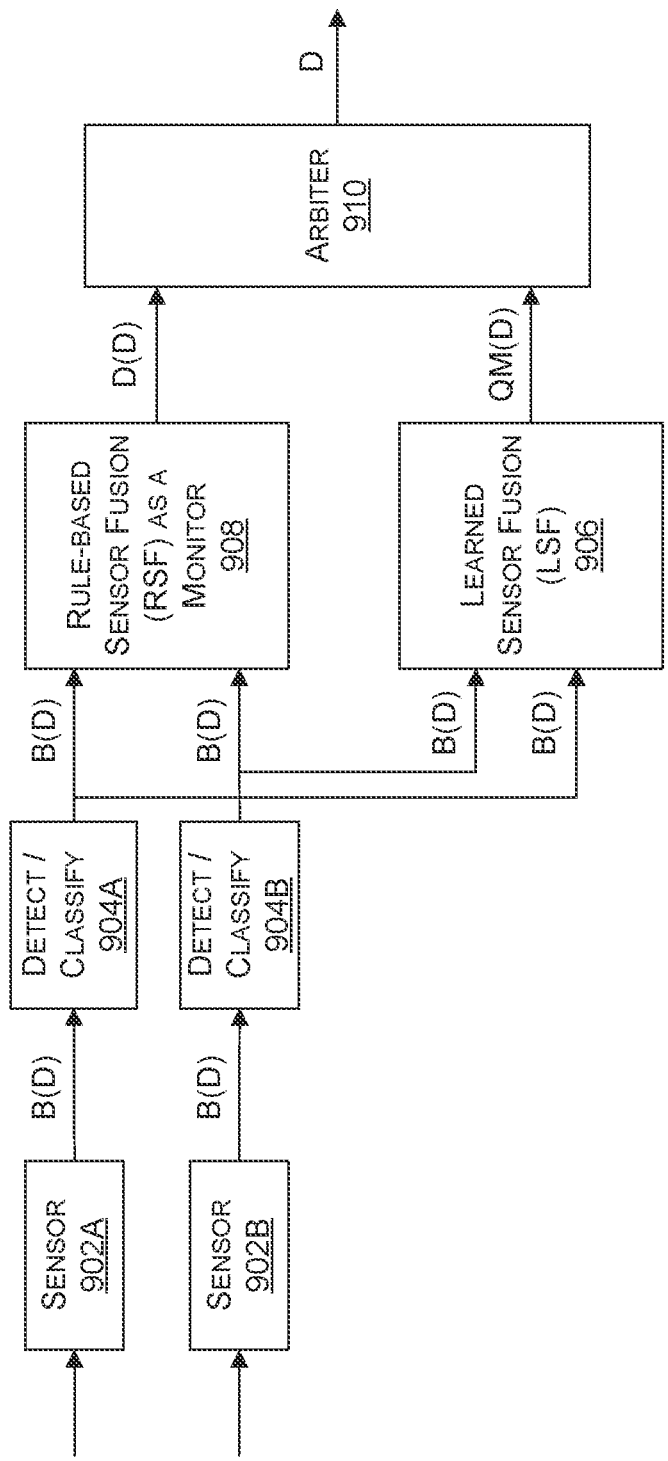

As a result of the safety integrity level and/or associated KPI drawbacks of learned sensor fusion, systems and methods of the present disclosure may combine or merge rule-based sensor fusion with learned sensor fusion in a way that takes advantage of the accuracy and precision of learned sensor fusion while maintaining the safety decomposition benefits of rule-based sensor fusion for compliance with higher or maximum safety integrity levels (e.g., ASIL D). The combination of learned sensor fusion (LSF) and rule-based sensor fusion (RSF) may be referred to as merged sensor fusion (MSF), and various architectures may be implemented—e.g., learned sensor fusion in series with rule-based sensor fusion (LSF_inS_RSF) (e.g., as illustrated in FIGS. 6 and 7), learned sensor fusion in parallel with rule-based sensor fusion (LSF_inP_RSF) (e.g., as illustrated in FIGS. 8 and 9), and/or other architectures, such as but not limited to those described herein.

Depending on the safety goal(s) corresponding to the merged sensor fusion architecture, the assignment of tasks to the learned sensor fusion and/or the rule-based sensor fusion may be determined. For example, learned sensor fusion may be used to compute outputs for safety goals with lower associated safety levels (e.g., ASIL B), while learned sensor fusion may be used to compute outputs that serve as hints or additional inputs to rule-based sensor fusion for safety goals with higher associated safety levels (e.g., ASIL D). In some embodiments, safety goals may be established after use cases and potential hazards of the system are analyzed. For example, safety goals may be assigned safety integrity levels that derive from the exposure (E) to, severity (S) of, and controllability (C) of the hazardous event that begat the Safety Goal. The exposure may correspond to a measure of the probability the system will encounter the relevant situation, the severity may correspond to an assessment of the consequences that could result from the hazardous event if it were encountered and missed and/or not mitigated, and the controllability may correspond to an assessment of the difficulty for humans or other systems to handle the hazard if it were encountered and were missed and/or not mitigated. The aggregation of these factors may generally be referred to as SEC. Generally, the lower the SEC score, the lower the safety integrity level required. For example, some hazards may have lower safety integrity level requirements because they are uncommon (e.g., road hazards such as refrigerators, old tires, etc.), the severity is low (e.g., a fender bender at low speed), and/or because the hazard is easy to control (e.g., a human driver is actively supervising and can take control if adaptive cruise control brakes too late for a traffic jam in front of the ego-vehicle 1500).

With respect to learned sensor fusion in series with rule-based sensor fusion, there may be various architectures that may be implemented, such as early learned sensor fusion in series with rule-based sensor fusion (ELSF_inS_RSF), late learned sensor fusion in series with rule-based sensor fusion (LLSF_inS_RSF), etc. FIGS. 6 and 7 illustrate early learned sensor fusion in series with rule-based sensor fusion and late learned sensor fusion in series with rule-based sensor fusion, respectively.

Figure 6:
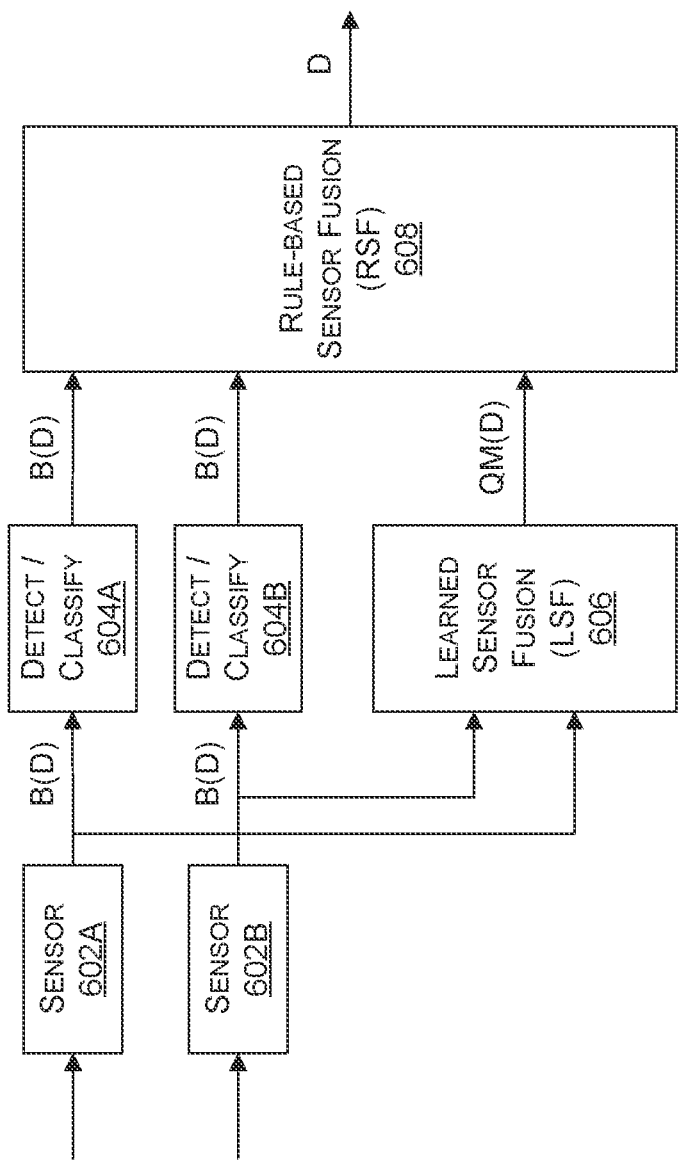
FIGS. 6-7 illustrate data flow diagrams corresponding to combining outputs from rule-based processing and learned processing to generate a fused output, in accordance with some embodiments of the present disclosure.
Figure 7:
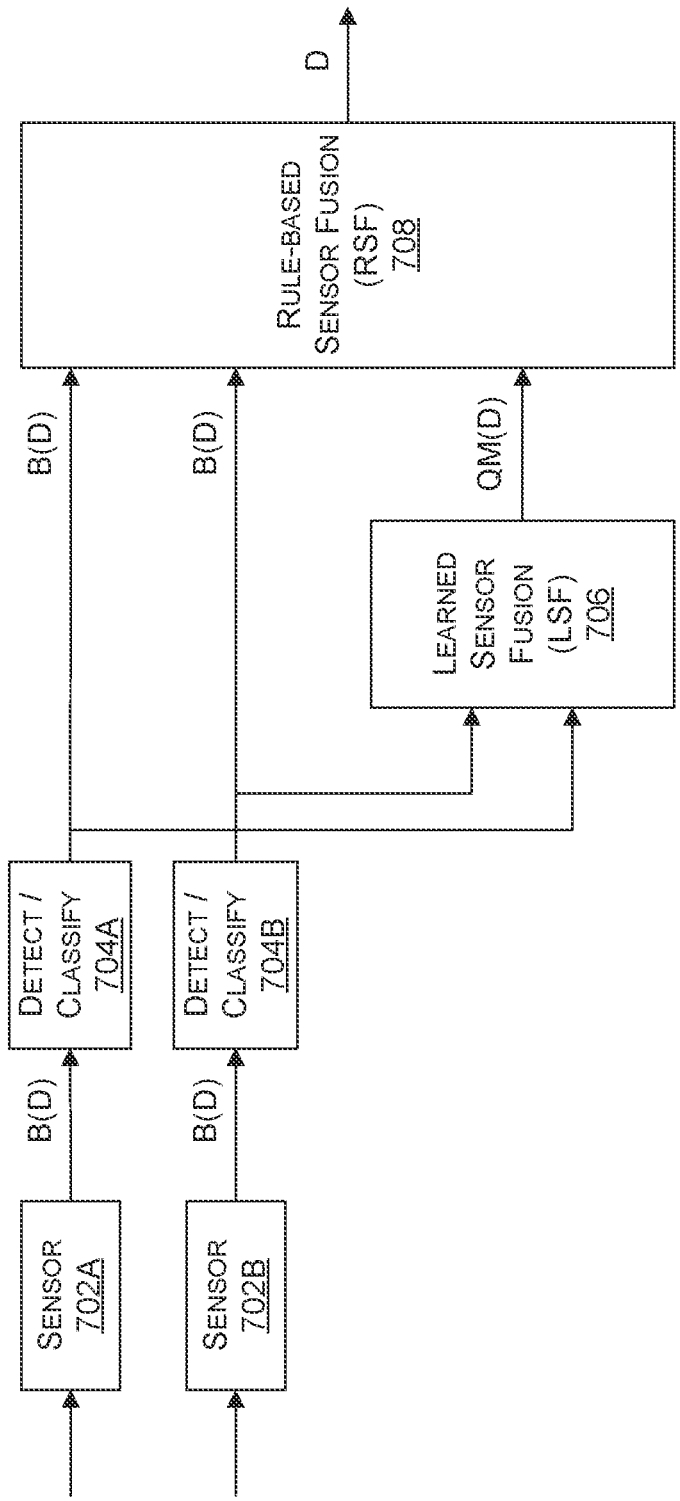

In the architectures of FIGS. 6-7, rule-based sensor fusion is assigned all safety goals and decomposes the goals corresponding ASIL levels over its independent sensor processing pipelines (e.g., sensor 202A processing pipeline including detection/classification algorithm or network 604A and sensor 202B pipeline including detection/classification algorithm or network 604B) as well over learned sensor fusion 606 that provides an additional input to rule-based sensor fusion 608 after processing sensor data from sensor 202A and/or sensor 202B. In FIG. 6, the learned sensor fusion algorithm 606 may correspond to a learned detection and/or classification fusion algorithm or network (e.g., a DNN) that receives the sensor signals as input and generates a fused output. In FIG. 7, learned sensor fusion algorithm 706 may correspond to a learned detection and/or classification algorithm or network that receives the individual outputs from the detection/classification components 704A (e.g., after processing sensor data from sensor 702A) and/or 704B (e.g., after processing sensor data from sensor 702B) and generates a fused output. The associated ASIL levels for the sensor signals, detection/classification outputs, and learned sensor fusion output are illustrated in FIGS. 6-7, as well as the ASIL level for the rule-based sensor fusion output (e.g., "B" corresponds to ASIL B, "B(D)" corresponds to ASIL B(D), and so on).

One illustrative decomposition of one ASIL D safety goal is shown in the examples, but the decomposition could be any valid decomposition (e.g., D=B(D)+B(D)). The quality management (QM)(B) may correspond to the signal output by learned sensor fusion (e.g., 606 and/or 706), as rule-based sensor fusion (e.g., 608 and/or 708) may use the learned sensor fusion output as a hint or quality management signal to aid in generating a final fused output at ASIL D. In some embodiments, any subset of the safety goals may be partitioned between sensor processing pipelines and learned sensor fusion, or the full set of safety goals assigned to all sensor processing pipelines and learned sensor fusion—e.g., so long as there is not a common cause failure for any ASIL D safety goal. For example, with reference to the former, the sensor 602A and/or 702A pipeline, the sensor 602B and/or 702B pipeline, and the learned sensor fusion pipeline (e.g., corresponding to learned sensor fusion 606 or 706) may each compute outputs corresponding to a same ASIL D safety goal—e.g., detecting pedestrians and vehicles within 30 meters of ego-vehicle 1500. As another example, with reference to the latter, the sensor 602A and/or 702A pipeline and/or the sensor 602B and/or 702B pipeline may each compute outputs corresponding to pedestrians and vehicles (e.g., an ASIL D safety goal), and the learned sensor fusion 606 and/or 706 may compute an output corresponding to road debris (e.g., an ASIL B safety goal). In such an example, the rule-based sensor fusion 608 and/or 708 may rely on the learned sensor fusion output for road debris and the sensor 602A or 702A pipeline and/or the sensor 602B or 702B pipeline for pedestrians and vehicles. In some embodiments, each of the sensor 602A or 702A pipelines, the sensor 602B or 702B pipelines, and the learned sensor fusion 606 or 706 may compute output corresponding to the same safety goals, but the learned sensor fusion 606 or 706 may be relied upon for certain safety goals (e.g., having lower safety levels) while the sensor 602A or 702A and/or sensor 602B or 702B pipelines may be relied upon by the rule-based sensor fusion 608 or 708 for other safety goals (e.g., having higher safety levels).

In some embodiments, such as where ASIL decomposition between, e.g., detect/classify 604A or 704A for sensor 602A or 702A at ASIL B(D) and learned sensor fusion 606 or 706 at ASIL B(D) may lead to potential common cause failures in sensor 602A or 702A, the sensor(s) may be developed to ASIL D such that the signal from sensor 602A or 702A is at ASIL D.

As such, in the examples of FIGS. 6-7, the ASIL D requirements assigned to rule-based sensor fusion may be decomposed to B(D) requirements over the two inputs where detect/classify is done on the two sensors independently. Learned sensor fusion may then be used to improve overall performance by giving rule-based sensor fusion additional information synthesized over the independent sensor processing pipelines. Rule-based sensor fusion may use the learned sensor fusion signal as a hint to improve its fusion performance. However, the algorithm and policy in rule-based sensor fusion may be analyzed to ensure that rule-based sensor fusion itself does not introduce a common cause failure between the two independent perception pipelines. The rule-based sensor fusion may also ensure that a safe output is generated if the learned sensor fusion signal disagrees with the independent perception pipelines (e.g., the sensor 602A or 702A and the sensor 602B or 702B pipelines). For example, if learned sensor fusion does not detect an obstacle that poses an imminent collision risk but the other pipelines do detect that obstacle, then rule-based sensor fusion may report the obstacle in order to comply with ASIL D. As another example, such as where a safety goal is to detect all pedestrians within 30 meters of the ego-vehicle 1500 with a failure rate of less than 1E-9, the accuracy of the learned sensor fusion may cause rule-based sensor fusion to rely on the learned sensor fusion for making initial decisions beyond 30 meters—e.g., to begin to slow down—and then to rely on the rule-based sensor fusion with respect to the independent sensor processing pipelines for decisions within 30 meters. However, even within 30 meters, the rule-based sensor fusion may use the learned sensor fusion output as a hint, or an additional input, but may not rely on the learned sensor fusion where in disagreement and the detection is within 30 meters.

With respect to FIGS. 8-11, and learned sensor fusion in parallel with rule-based sensor fusion (LSF_inP_RSF), there may be various architectures implemented—e.g., early learned sensor fusion in parallel with rule-based sensor fusion (ELSF_inP_RSF), late learned sensor fusion in parallel with rule-based sensor fusion (LLSF_inP_RSF), etc. Within these various architectures, there may be different architectures where rule-based sensor fusion may be a monitor for learned sensor fusion or where both learned sensor fusion and rule-based sensor fusion are employed but with partitioned safety goals—e.g., by partitioning safety goals into disjoint subsets that are assigned to a learned sensor fusion or a rule-based sensor fusion. These architectures may include ELSF_inP_RSF—monitor architecture, LLSF_inP_RSF—monitor architecture, ELSF_inP_RSF—disjoint safety goal architecture, LLSF_inP_RSF—disjoint safety goal architecture, etc.

Where a monitor architecture is implemented, rule-based sensor fusion may execute in parallel with learned sensor fusion, and an arbiter or decision component may use the rule-based sensor fusion output to monitor the learned sensor fusion output. In some embodiments, the arbiter may limit the learned sensor fusion results, or may completely override learned sensor fusion results by triggering shutdown of autonomous engagement, for example (which may be referred to as "a safety monitor"). In one or more monitor architecture variants, decomposition between learned sensor fusion and rule-based sensor fusion may be executed by the arbiter, which may choose a valid safety integrity decomposition, and may implicate either learned sensor fusion or rule-based sensor fusion in any or all of the safety goals assigned to it.

FIGS. 8 and 9 include two illustrative examples of the monitor architectures. In these examples, the ASIL D requirement on an arbiter 810 or 910 may be decomposed between rule-based sensor fusion 808 or 908 and learned sensor fusion 806 or 906, where the rule-based sensor fusion 808 or 908 may serve as a monitor for the learned sensor fusion. In embodiments, the arbiter 810 or 910 may correspond to a rule-based component in an effort to satisfy the ASIL D or higher level safety requirements for decomposition. However, in embodiments where a lower safety level safety goal is implemented, the arbiter 810 or 910 may include a learned component.

For example, in FIG. 8, the late rule-based sensor fusion 808 may be executed on the sensor 802A pipeline (e.g., including detection or classification algorithm or network 804A) and the sensor 802B (e.g., including detection or classification algorithm or network 804B) pipeline to compute an ASIL D output, and early learned sensor fusion 806 may be executed on the sensor 802A and sensor 802B sensor output signals to compute a quality management (QM) signal for use by the arbiter 810 in making an ASIL D decision. As described herein, the learned sensor fusion output may be relied upon, in embodiments, where doing so may be equally as conservative as or more conservative than relying on the rule-based sensor fusion output.

As another example, in FIG. 9, the late rule-based sensor fusion 908 may be executed on the sensor 902A pipeline (e.g., including detection or classification algorithm or network 904A) and the sensor 902B pipeline (e.g., including detection or classification algorithm or network 904B) to compute an ASIL D output, and late learned sensor fusion 906 may be executed on the sensor 902A pipeline and sensor 902B pipeline to compute a quality management output for use by the arbiter in making an ASIL D decision.

In the examples of FIGS. 8-9, the learned sensor fusion and the rule-based sensor fusion outputs may correspond to a same safety goal—e.g., detecting and/or classifying vehicles and pedestrians—and the rule-based sensor fusion output may be relied upon by the arbiter where in disagreement with the learned sensor fusion, and the outputs correspond to a requirement of a current safety goal. For example, if the requirement is that any obstacle within 30 meters of the ego-vehicle 1500 must be detected, and the learned sensor fusion does not detect an object but rule-based sensor fusion does, the rule-based sensor fusion may be relied upon to satisfy the higher safety level achievable by the rule-based sensor fusion. As another example, if the requirement is that an obstacle must be detected when within 30 meters of the ego-vehicle 1500, and the learned sensor fusion detects an object 50 meters away that the rule-based sensor fusion does not, the learned sensor fusion may be relied upon to take an action—e.g., to begin to slow down—at least until the object is within a 30 meter distance of the ego-vehicle 1500 at which time the rule-based sensor fusion outputs may be relied upon.

Figure 10:
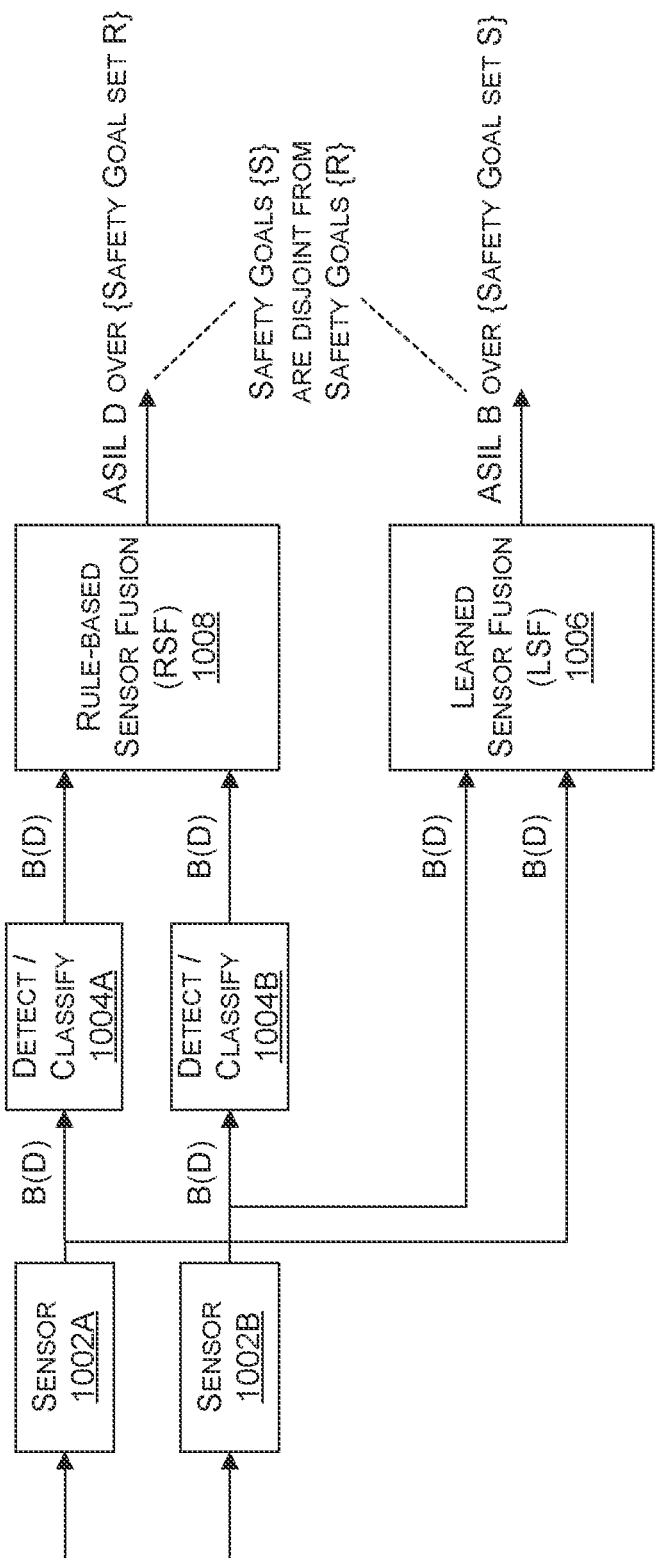
FIGS. 10-12 illustrate data flow diagrams corresponding to using learned fusion and rule-based fusion for different safety goals of a system, in accordance with some embodiments of the present disclosure.
Figure 11:
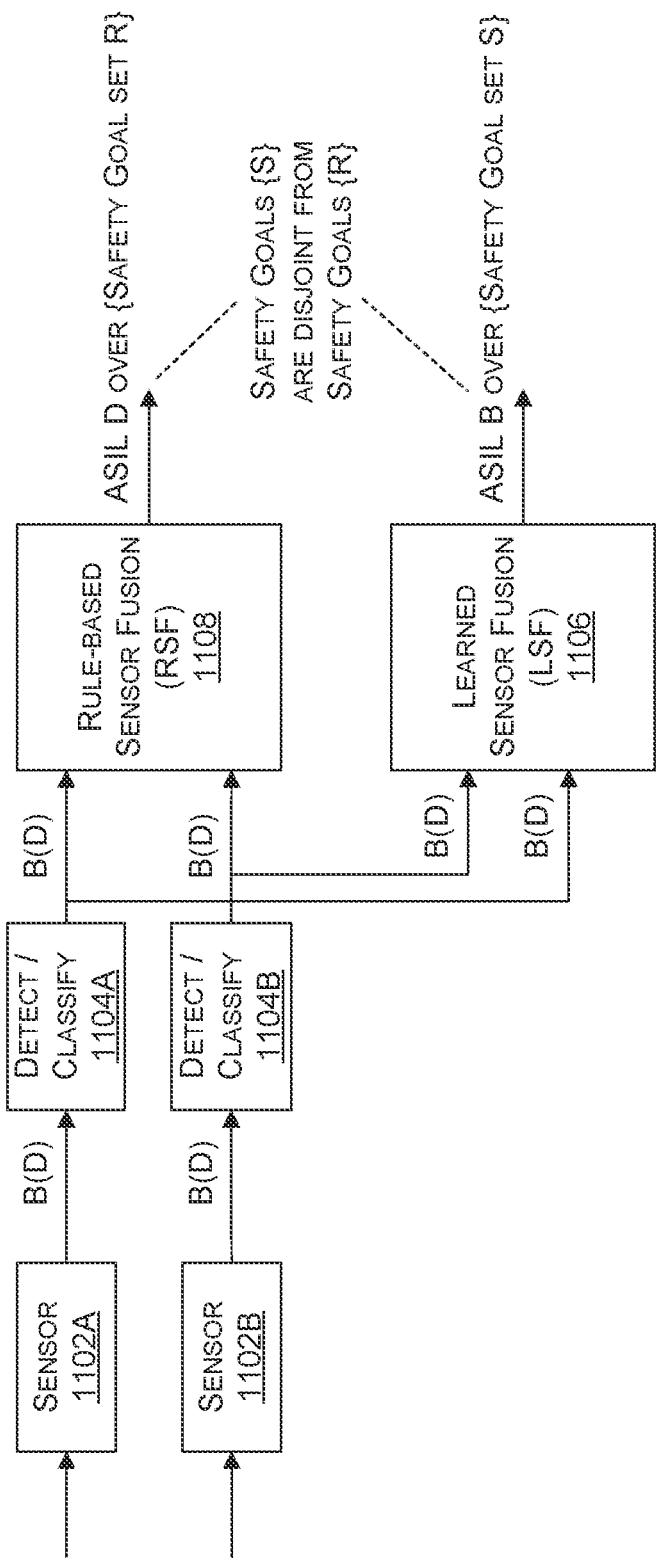

With respect to FIGS. 10-11, and the disjoint safety goal architectures, rule-based sensor fusion may execute in parallel with learned sensor fusion, but each may be assigned a disjoint subset of safety goals—e.g., learned sensor fusion may include at least one safety goal different from rule-based sensor fusion, but they each may include one or more shared safety goals as well (e.g., where the shared safety goal corresponds to a lower safety level, such as ASIL B). In such embodiments, the learned sensor fusion and the rule-based sensor fusion may only be required to achieve the safety integrity level of the safety goals assigned to it. These architectures may allow for application of a standalone learned sensor fusion component that is tailored to events that have lower safety integrity requirements (e.g., events with lower SEC scores).

FIGS. 10-11 include illustrative examples of two disjoint safety goal architectures. In these examples, a safety goal set R may be assigned an ASIL D requirement, and a safety goal set S may be assigned an ASIL B requirement, where R and S are at least partially disjoint—although they may be fully disjoint, in embodiments. As such, learned sensor fusion 1006 and rule-based sensor fusion 1008 may operate together to cover all of the assigned safety goals R and S. For example, with respect to FIG. 10, sensor data from sensor 1002A and 1002B may be used by learned sensor fusion 1006 to generate an output at ASIL B over safety goals S, and the sensor processing pipelines of sensor 1002A (including detection or classification algorithm or network 1004A) and sensor 1002B (including detection or classification algorithm or network 1004B) may be used by rule-based fusion 1008 to generate an output at ASIL D over safety goals R. As another example, and with respect to FIG. 11, outputs from the sensor processing pipelines of sensor 1102A (including detection or classification algorithm or network 1104A) and sensor 1102B (including detection or classification algorithm or network 1104B) may be used by rule-based fusion 1108 to generate an output at ASIL D over safety goals R, and may be used by learned sensor fusion 1106 to generate an output at ASIL B over safety goals S.

Figure 12:
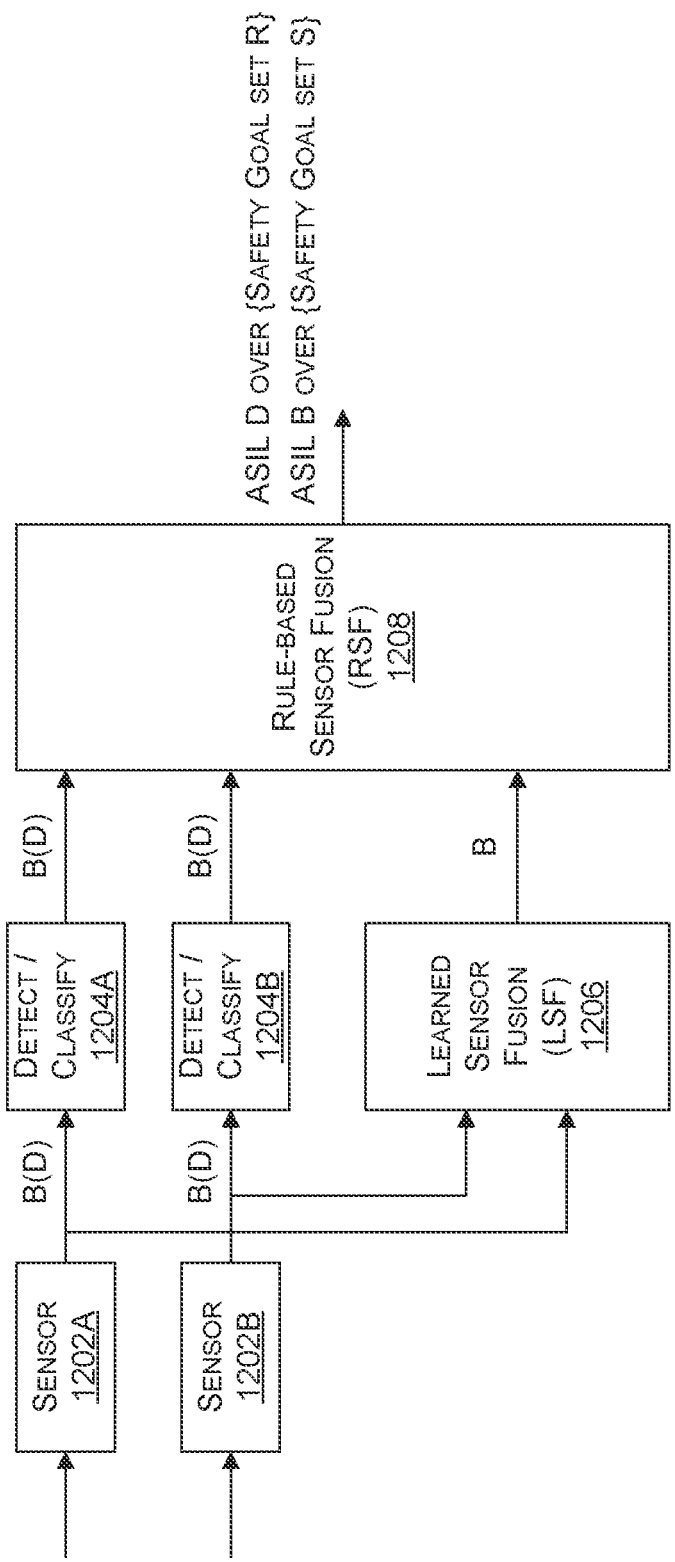

FIG. 12 includes another example of a disjoint safety goals architecture that is executed, e.g., for road hazard detection using learned sensor fusion in parallel with rule-based sensor fusion, in accordance with one or more embodiments of the present disclosure. For advanced autonomous driving, the ASIL requirement for detection of vehicles and pedestrians may be derived to be ASIL D, while the ASIL requirement for detection of road hazards may be derived to be ASIL B (e.g., since road hazards such as refrigerators and old tires may be assessed as uncommon on major highways, thus having a lower SEC score). Since a learned sensor fusion architecture may achieve ASIL B, standalone learned sensor fusion may be employed to cover the safety goal of road hazard detection. Similarly, since learned sensor fusion 1206 may not be capable of achieving ASIL D, rule-based sensor fusion 1208 or a combined rule-based and learned sensor fusion architecture may be used to meet the ASIL requirements for detection of vehicles and pedestrians. Both embodiments may correspond to valid architectures, the former being illustrated in FIGS. 10-11, herein. The disjoint safety goals can also be applied to other architectures described herein, such as in FIGS. 6-9, for example. As an example, a disjoint ASIL B safety goal may be added to the early learned sensor fusion in series with rule-based sensor fusion architecture herein, which may already be solving an ASIL D safety goal. An example of which is illustrated in FIG. 12, where the ASIL B requirement may then be satisfied using learned sensor fusion 1206 (e.g., since learned sensor fusion can support ASIL B) and, in this way, different safety goals may be satisfied using a combination of both learned sensor fusion 1206 and rule-based sensor fusion 1208 in order to use their respective strengths while still achieving the required safety integrity. In FIG. 12, the safety goal sets R and S may be similar to those described herein with respect to FIGS. 10-11, and learned sensor fusion 1206 may be used to generate an output after processing the input sensor data from sensors 1202A and 1202B, while the rule-based sensor fusion 1208 may use the outputs of detection or classification algorithms or networks 1204A and 1204B, in addition to the output of the learned sensor fusion 1206, to generate a final output over the different safety goals R and S. For example, for the safety goals S, the rule-based sensor fusion 1208 may favor the output from the learned sensor fusion 1206, or may rely solely on the learned sensor fusion 1206. For ASIL B, the rule-based sensor fusion 1208 may rely on the sensor processing pipelines and, in embodiments, the output of the learned sensor fusion 1206.

As such, in the example of FIG. 12, the rule-base sensor fusion 1208 may determine which outputs to use—e.g., sensor 1202AA processing pipeline outputs, sensor 1202B pipeline outputs, and/or learned sensor fusion 1206 outputs—based on the current safety goal(s). Because one or more safety goals may be shared between learned sensor fusion 1206 and the sensor 1202A and/or sensor 1202B processing pipelines, at some iterations any two or more of the outputs may be relied upon by rule-based sensor fusion 1208 to determine a final output that satisfies associated safety integrity levels.

In the examples described herein, even though only two sensors and/or sensor processing pipelines are illustrated, this is not intended to be limiting. For example, any number of sensors and/or sensor processing pipelines may be used and, so long as there are no common cause failures between two or more sensors, ASIL D requirements may be met when employed with rule-base sensor fusion. As such, in FIG. 12, for example, there may be an additional sensor 1202C, and the illustrated sensor 1202B detect/classify component 1204B (which may be a learned processing component) may take sensor 1202B and sensor 1202C signals as input, and compute the output to the rule-based sensor fusion 1208. In such an example, the output of the rule-based sensor fusion 1208 may still satisfy ASIL D as there can be no common cause failure between sensor 1202A and sensors 1202B and/or 1202C.

Figure 13:
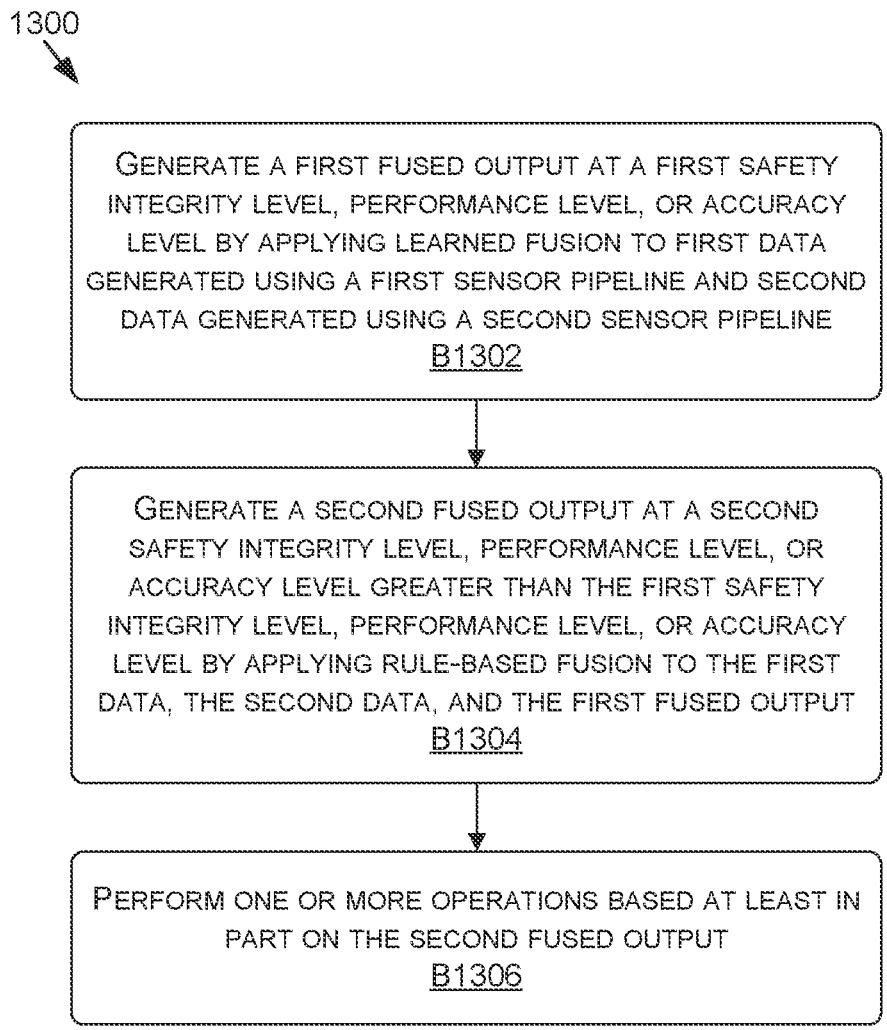
FIGS. 13-14 are flow diagrams showing methods for combining learned and rule-based outputs to generate a fused output, in accordance with some embodiments of the present disclosure.
Figure 14:
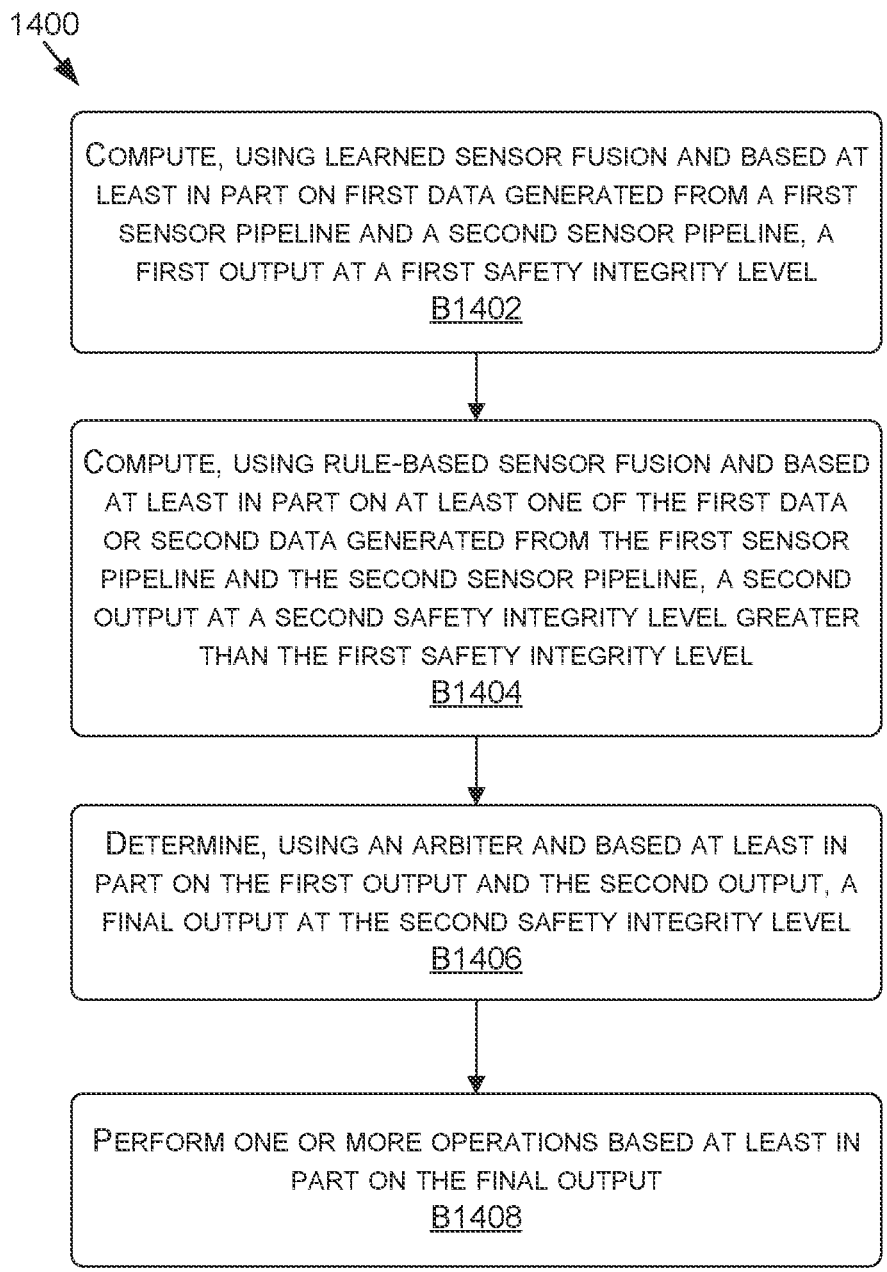

Now referring to FIGS. 13-14, each block of methods 1300 and 1400, described herein, comprises a computing process that may be performed using any combination of hardware, firmware, and/or software. For instance, various functions may be carried out by a processor executing instructions stored in memory. The methods 1300 and 1400 may also be embodied as computer-usable instructions stored on computer storage media. The methods 1300 and 1400 may be provided by a standalone application, a service or hosted service (standalone or in combination with another hosted service), or a plug-in to another product, to name a few. In addition, methods 1300 and 1400 may be executed by any one system, or any combination of systems, including, but not limited to, those described herein.

With reference to FIG. 13, FIG. 13 is a flow diagram showing a method 1300 for combining learned and rule-based outputs to generate a fused output, in accordance with some embodiments of the present disclosure. The method 1300, at block B1302, includes generating a first fused output at a first safety integrity level, performance level, or accuracy level by applying learned fusion to first data generated using a first sensor processing pipeline and second data generated using a second sensor processing pipeline.

The method 1300, at block B1304, includes generating a second fused output at a second safety integrity level, performance level, or accuracy level greater than the first safety integrity level, performance level, or accuracy level by applying rule-based fusion to the first data, the second data, and the first fused output.

The method 1300, at block B1306, includes performing one or more operations based at least in part on the second fused output.

Now referring to FIG. 14, FIG. 14 is a flow diagram showing a method 1400 for combining learned and rule-based outputs to generate a fused output, in accordance with some embodiments of the present disclosure. The method 1400, at block B1402, includes computing, using learned sensor fusion and based at least in part on first data generated from a first sensor processing pipeline and a second sensor processing pipeline, a first output at a first safety integrity level.

The method 1400, at block B1404, includes computing, using rule-based sensor fusion and based at least in part on at least one of the first data or second data generated from the first sensor processing pipeline and the second sensor processing pipeline, a second output at a second safety integrity level greater than the first safety integrity level.

The method 1400, at block B1406, includes determining, using an arbiter and based at least in part on the first output and the second output, a final output at the second safety integrity level.

The method 1400, at block B1408, includes performing one or more operations based at least in part on the final output.

Example Autonomous Vehicle

FIG. 15A is an illustration of an example autonomous vehicle 1500, in accordance with some embodiments of the present disclosure. The autonomous vehicle 1500 (alternatively referred to herein as the "vehicle 1500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1500 may be capable of functionality in accordance with one or more of Level 3-Level 5 of the autonomous driving levels. The vehicle 1500 may be capable of functionality in accordance with one or more of Level 1-Level 5 of the autonomous driving levels. For example, the vehicle 1500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1500 or other machine, such as being fully autonomous, being highly autonomous, being conditionally autonomous, being partially autonomous, providing assistive autonomy, being semi-autonomous, being primarily autonomous, or other designation.

The vehicle 1500 may include components such as a chassis, a vehicle body, wheels (e.g., 2, 4, 6, 8, 18, etc.), tires, axles, and other components of a vehicle. The vehicle 1500 may include a propulsion system 1550, such as an internal combustion engine, hybrid electric power plant, an all-electric engine, and/or another propulsion system type. The propulsion system 1550 may be connected to a drive train of the vehicle 1500, which may include a transmission, to enable the propulsion of the vehicle 1500. The propulsion system 1550 may be controlled in response to receiving signals from the throttle/accelerator 1552.

A steering system 1554, which may include a steering wheel, may be used to steer the vehicle 1500 (e.g., along a desired path or route) when the propulsion system 1550 is operating (e.g., when the vehicle is in motion). The steering system 1554 may receive signals from a steering actuator 1556. The steering wheel may be optional for full automation (Level 5) functionality.

The brake sensor system 1546 may be used to operate the vehicle brakes in response to receiving signals from the brake actuators 1548 and/or brake sensors.

Controller(s) 1536, which may include one or more system on chips (SoCs) 1504 (FIG. 15C) and/or GPU(s), may provide signals (e.g., representative of commands) to one or more components and/or systems of the vehicle 1500. For example, the controller(s) may send signals to operate the vehicle brakes via one or more brake actuators 1548, to operate the steering system 1554 via one or more steering actuators 1556, to operate the propulsion system 1550 via one or more throttle/accelerators 1552. The controller(s) 1536 may include one or more onboard (e.g., integrated) computing devices (e.g., supercomputers) that process sensor signals, and output operation commands (e.g., signals representing commands) to enable autonomous driving and/or to assist a human driver in driving the vehicle 1500. The controller(s) 1536 may include a first controller 1536 for autonomous driving functions, a second controller 1536 for functional safety functions, a third controller 1536 for artificial intelligence functionality (e.g., computer vision), a fourth controller 1536 for infotainment functionality, a fifth controller 1536 for redundancy in emergency conditions, and/or other controllers. In some examples, a single controller 1536 may handle two or more of the above functionalities, two or more controllers 1536 may handle a single functionality, and/or any combination thereof.

The controller(s) 1536 may provide the signals for controlling one or more components and/or systems of the vehicle 1500 in response to sensor data received from one or more sensors (e.g., sensor inputs). The sensor data may be received from, for example and without limitation, global navigation satellite systems sensor(s) 1558 (e.g., Global Positioning System sensor(s)), RADAR sensor(s) 1560, ultrasonic sensor(s) 1562, LIDAR sensor(s) 1564, inertial measurement unit (IMU) sensor(s) 1566 (e.g., accelerometer(s), gyroscope(s), magnetic compass(es), magnetometer(s), etc.), microphone(s) 1596, stereo camera(s) 1568, wide-view camera(s) 1570 (e.g., fisheye cameras), infrared camera(s) 1572, surround camera(s) 1574 (e.g., 360 degree cameras), long-range and/or mid-range camera(s) 1598, speed sensor(s) 1544 (e.g., for measuring the speed of the vehicle 1500), vibration sensor(s) 1542, steering sensor(s) 1540, brake sensor(s) (e.g., as part of the brake sensor system 1546), and/or other sensor types.

One or more of the controller(s) 1536 may receive inputs (e.g., represented by input data) from an instrument cluster 1532 of the vehicle 1500 and provide outputs (e.g., represented by output data, display data, etc.) via a human-machine interface (HMI) display 1534, an audible annunciator, a loudspeaker, and/or via other components of the vehicle 1500. The outputs may include information such as vehicle velocity, speed, time, map data (e.g., the HD map 1522 of FIG. 15C), location data (e.g., the vehicle's 1500 location, such as on a map), direction, location of other vehicles (e.g., an occupancy grid), information about objects and status of objects as perceived by the controller(s) 1536, etc. For example, the HMI display 1534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1500 further includes a network interface 1524 which may use one or more wireless antenna(s) 1526 and/or modem(s) to communicate over one or more networks. For example, the network interface 1524 may be capable of communication over LTE, WCDMA, UMTS, GSM, CDMA2000, etc. The wireless antenna(s) 1526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 15B is an example of camera locations and fields of view for the example autonomous vehicle 1500 of FIG. 15A, in accordance with some embodiments of the present disclosure. The cameras and respective fields of view are one example embodiment and are not intended to be limiting. For example, additional and/or alternative cameras may be included and/or the cameras may be located at different locations on the vehicle 1500.

The camera types for the cameras may include, but are not limited to, digital cameras that may be adapted for use with the components and/or systems of the vehicle 1500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1500 (e.g., front-facing cameras) may be used for surround view, to help identify forward facing paths and obstacles, as well aid in, with the help of one or more controllers 1536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1570 that may be used to perceive objects coming into view from the periphery (e.g., pedestrians, crossing traffic or bicycles). Although only one wide-view camera is illustrated in FIG. 15B, there may any number of wide-view cameras 1570 on the vehicle 1500. In addition, long-range camera(s) 1598 (e.g., a long-view stereo camera pair) may be used for depth-based object detection, especially for objects for which a neural network has not yet been trained. The long-range camera(s) 1598 may also be used for object detection and classification, as well as basic object tracking.

One or more stereo cameras 1568 may also be included in a front-facing configuration. The stereo camera(s) 1568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1568 may be used in addition to, or alternatively from, those described herein.

Cameras with a field of view that include portions of the environment to the side of the vehicle 1500 (e.g., side-view cameras) may be used for surround view, providing information used to create and update the occupancy grid, as well as to generate side impact collision warnings. For example, surround camera(s) 1574 (e.g., four surround cameras 1574 as illustrated in FIG. 15B) may be positioned to on the vehicle 1500. The surround camera(s) 1574 may include wide-view camera(s) 1570, fisheye camera(s), 360 degree camera(s), and/or the like. Four example, four fisheye cameras may be positioned on the vehicle's front, rear, and sides. In an alternative arrangement, the vehicle may use three surround camera(s) 1574 (e.g., left, right, and rear), and may leverage one or more other camera(s) (e.g., a forward-facing camera) as a fourth surround view camera.

Cameras with a field of view that include portions of the environment to the rear of the vehicle 1500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1598, stereo camera(s) 1568), infrared camera(s) 1572, etc.), as described herein.

FIG. 15C is a block diagram of an example system architecture for the example autonomous vehicle 1500 of FIG. 15A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1500 in FIG. 15C are illustrated as being connected via bus 1502. The bus 1502 may include a Controller Area Network (CAN) data interface (alternatively referred to herein as a "CAN bus"). A CAN may be a network inside the vehicle 1500 used to aid in control of various features and functionality of the vehicle 1500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1502 is described herein as being a CAN bus, this is not intended to be limiting. For example, in addition to, or alternatively from, the CAN bus, FlexRay and/or Ethernet may be used. Additionally, although a single line is used to represent the bus 1502, this is not intended to be limiting. For example, there may be any number of busses 1502, which may include one or more CAN busses, one or more FlexRay busses, one or more Ethernet busses, and/or one or more other types of busses using a different protocol. In some examples, two or more busses 1502 may be used to perform different functions, and/or may be used for redundancy. For example, a first bus 1502 may be used for collision avoidance functionality and a second bus 1502 may be used for actuation control. In any example, each bus 1502 may communicate with any of the components of the vehicle 1500, and two or more busses 1502 may communicate with the same components. In some examples, each SoC 1504, each controller 1536, and/or each computer within the vehicle may have access to the same input data (e.g., inputs from sensors of the vehicle 1500), and may be connected to a common bus, such the CAN bus.

The vehicle 1500 may include one or more controller(s) 1536, such as those described herein with respect to FIG. 15A. The controller(s) 1536 may be used for a variety of functions. The controller(s) 1536 may be coupled to any of the various other components and systems of the vehicle 1500, and may be used for control of the vehicle 1500, artificial intelligence of the vehicle 1500, infotainment for the vehicle 1500, and/or the like.

The vehicle 1500 may include a system(s) on a chip (SoC) 1504. The SoC 1504 may include CPU(s) 1506, GPU(s) 1508, processor(s) 1510, cache(s) 1512, accelerator(s) 1514, data store(s) 1516, and/or other components and features not illustrated. The SoC(s) 1504 may be used to control the vehicle 1500 in a variety of platforms and systems. For example, the SoC(s) 1504 may be combined in a system (e.g., the system of the vehicle 1500) with an HD map 1522 which may obtain map refreshes and/or updates via a network interface 1524 from one or more servers (e.g., server(s) 1578 of FIG. 15D).

The CPU(s) 1506 may include a CPU cluster or CPU complex (alternatively referred to herein as a "CCPLEX"). The CPU(s) 1506 may include multiple cores and/or L2 caches. For example, in some embodiments, the CPU(s) 1506 may include eight cores in a coherent multi-processor configuration. In some embodiments, the CPU(s) 1506 may include four dual-core clusters where each cluster has a dedicated L2 cache (e.g., a 2 MB L2 cache). The CPU(s) 1506 (e.g., the CCPLEX) may be configured to support simultaneous cluster operation enabling any combination of the clusters of the CPU(s) 1506 to be active at any given time.

The CPU(s) 1506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1508 may include an integrated GPU (alternatively referred to herein as an "iGPU"). The GPU(s) 1508 may be programmable and may be efficient for parallel workloads. The GPU(s) 1508, in some examples, may use an enhanced tensor instruction set. The GPU(s) 1508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1508 may include at least eight streaming microprocessors. The GPU(s) 1508 may use compute application programming interface(s) (API(s)). In addition, the GPU(s) 1508 may use one or more parallel computing platforms and/or programming models (e.g., NVIDIA's CUDA).

The GPU(s) 1508 may be power-optimized for best performance in automotive and embedded use cases. For example, the GPU(s) 1508 may be fabricated on a Fin field-effect transistor (FinFET). However, this is not intended to be limiting and the GPU(s) 1508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1508 to access the CPU(s) 1506 page tables directly. In such examples, when the GPU(s) 1508 memory management unit (MMU) experiences a miss, an address translation request may be transmitted to the CPU(s) 1506. In response, the CPU(s) 1506 may look in its page tables for the virtual-to-physical mapping for the address and transmits the translation back to the GPU(s) 1508. As such, unified memory technology may allow a single unified virtual address space for memory of both the CPU(s) 1506 and the GPU(s) 1508, thereby simplifying the GPU(s) 1508 programming and porting of applications to the GPU(s) 1508.

In addition, the GPU(s) 1508 may include an access counter that may keep track of the frequency of access of the GPU(s) 1508 to memory of other processors. The access counter may help ensure that memory pages are moved to the physical memory of the processor that is accessing the pages most frequently.

The SoC(s) 1504 may include any number of cache(s) 1512, including those described herein. For example, the cache(s) 1512 may include an L3 cache that is available to both the CPU(s) 1506 and the GPU(s) 1508 (e.g., that is connected both the CPU(s) 1506 and the GPU(s) 1508). The cache(s) 1512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1504 may include an arithmetic logic unit(s) (ALU(s)) which may be leveraged in performing processing with respect to any of the variety of tasks or operations of the vehicle 1500—such as processing DNNs. In addition, the SoC(s) 1504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1506 and/or GPU(s) 1508.

The SoC(s) 1504 may include one or more accelerators 1514 (e.g., hardware accelerators, software accelerators, or a combination thereof). For example, the SoC(s) 1504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1508 and to off-load some of the tasks of the GPU(s) 1508 (e.g., to free up more cycles of the GPU(s) 1508 for performing other tasks). As an example, the accelerator(s) 1514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1508, and by using an inference accelerator, for example, a designer may target either the DLA(s) or the GPU(s) 1508 for any function. For example, the designer may focus processing of CNNs and floating point operations on the DLA(s) and leave other functions to the GPU(s) 1508 and/or other accelerator(s) 1514.

The accelerator(s) 1514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1514 (e.g., the hardware acceleration cluster) may include a computer vision network on-chip and SRAM, for providing a high-bandwidth, low latency SRAM for the accelerator(s) 1514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1566 output that correlates with the vehicle 1500 orientation, distance, 3D location estimates of the object obtained from the neural network and/or other sensors (e.g., LIDAR sensor(s) 1564 or RADAR sensor(s) 1560), among others.

The SoC(s) 1504 may include data store(s) 1516 (e.g., memory). The data store(s) 1516 may be on-chip memory of the SoC(s) 1504, which may store neural networks to be executed on the GPU and/or the DLA. In some examples, the data store(s) 1516 may be large enough in capacity to store multiple instances of neural networks for redundancy and safety. The data store(s) 1512 may comprise L2 or L3 cache(s) 1512. Reference to the data store(s) 1516 may include reference to the memory associated with the PVA, DLA, and/or other accelerator(s) 1514, as described herein.

The SoC(s) 1504 may include one or more processor(s) 1510 (e.g., embedded processors). The processor(s) 1510 may include a boot and power management processor that may be a dedicated processor and subsystem to handle boot power and management functions and related security enforcement. The boot and power management processor may be a part of the SoC(s) 1504 boot sequence and may provide runtime power management services. The boot power and management processor may provide clock and voltage programming, assistance in system low power state transitions, management of SoC(s) 1504 thermals and temperature sensors, and/or management of the SoC(s) 1504 power states. Each temperature sensor may be implemented as a ring-oscillator whose output frequency is proportional to temperature, and the SoC(s) 1504 may use the ring-oscillators to detect temperatures of the CPU(s) 1506, GPU(s) 1508, and/or accelerator(s) 1514. If temperatures are determined to exceed a threshold, the boot and power management processor may enter a temperature fault routine and put the SoC(s) 1504 into a lower power state and/or put the vehicle 1500 into a chauffeur to safe stop mode (e.g., bring the vehicle 1500 to a safe stop).

The processor(s) 1510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1510 may further include a real-time camera engine that may include a dedicated processor subsystem for handling real-time camera management.

The processor(s) 1510 may further include a high-dynamic range signal processor that may include an image signal processor that is a hardware engine that is part of the camera processing pipeline.

The processor(s) 1510 may include a video image compositor that may be a processing block (e.g., implemented on a microprocessor) that implements video post-processing functions needed by a video playback application to produce the final image for the player window. The video image compositor may perform lens distortion correction on wide-view camera(s) 1570, surround camera(s) 1574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1508 is not required to continuously render new surfaces. Even when the GPU(s) 1508 is powered on and active doing 3D rendering, the video image compositor may be used to offload the GPU(s) 1508 to improve performance and responsiveness.

The SoC(s) 1504 may further include a mobile industry processor interface (MIPI) camera serial interface for receiving video and input from cameras, a high-speed interface, and/or a video input block that may be used for camera and related pixel input functions. The SoC(s) 1504 may further include an input/output controller(s) that may be controlled by software and may be used for receiving I/O signals that are uncommitted to a specific role.

The SoC(s) 1504 may further include a broad range of peripheral interfaces to enable communication with peripherals, audio codecs, power management, and/or other devices. The SoC(s) 1504 may be used to process data from cameras (e.g., connected over Gigabit Multimedia Serial Link and Ethernet), sensors (e.g., LIDAR sensor(s) 1564, RADAR sensor(s) 1560, etc. that may be connected over Ethernet), data from bus 1502 (e.g., speed of vehicle 1500, steering wheel position, etc.), data from GNSS sensor(s) 1558 (e.g., connected over Ethernet or CAN bus). The SoC(s) 1504 may further include dedicated high-performance mass storage controllers that may include their own DMA engines, and that may be used to free the CPU(s) 1506 from routine data management tasks.

The SoC(s) 1504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1504 may be faster, more reliable, and even more energy-efficient and space-efficient than conventional systems. For example, the accelerator(s) 1514, when combined with the CPU(s) 1506, the GPU(s) 1508, and the data store(s) 1516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1508.

In some examples, a CNN for facial recognition and vehicle owner identification may use data from camera sensors to identify the presence of an authorized driver and/or owner of the vehicle 1500. The always on sensor processing engine may be used to unlock the vehicle when the owner approaches the driver door and turn on the lights, and, in security mode, to disable the vehicle when the owner leaves the vehicle. In this way, the SoC(s) 1504 provide for security against theft and/or carjacking.

In another example, a CNN for emergency vehicle detection and identification may use data from microphones 1596 to detect and identify emergency vehicle sirens. In contrast to conventional systems, that use general classifiers to detect sirens and manually extract features, the SoC(s) 1504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1562, until the emergency vehicle(s) passes.

The vehicle may include a CPU(s) 1518 (e.g., discrete CPU(s), or dCPU(s)), that may be coupled to the SoC(s) 1504 via a high-speed interconnect (e.g., PCIe). The CPU(s) 1518 may include an X86 processor, for example. The CPU(s) 1518 may be used to perform any of a variety of functions, including arbitrating potentially inconsistent results between ADAS sensors and the SoC(s) 1504, and/or monitoring the status and health of the controller(s) 1536 and/or infotainment SoC 1530, for example.

The vehicle 1500 may include a GPU(s) 1520 (e.g., discrete GPU(s), or dGPU(s)), that may be coupled to the SoC(s) 1504 via a high-speed interconnect (e.g., NVIDIA's NVLINK). The GPU(s) 1520 may provide additional artificial intelligence functionality, such as by executing redundant and/or different neural networks, and may be used to train and/or update neural networks based on input (e.g., sensor data) from sensors of the vehicle 1500.

The vehicle 1500 may further include the network interface 1524 which may include one or more wireless antennas 1526 (e.g., one or more wireless antennas for different communication protocols, such as a cellular antenna, a Bluetooth antenna, etc.). The network interface 1524 may be used to enable wireless connectivity over the Internet with the cloud (e.g., with the server(s) 1578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1500 information about vehicles in proximity to the vehicle 1500 (e.g., vehicles in front of, on the side of, and/or behind the vehicle 1500). This functionality may be part of a cooperative adaptive cruise control functionality of the vehicle 1500.

The network interface 1524 may include a SoC that provides modulation and demodulation functionality and enables the controller(s) 1536 to communicate over wireless networks. The network interface 1524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1500 may further include data store(s) 1528 which may include off-chip (e.g., off the SoC(s) 1504) storage. The data store(s) 1528 may include one or more storage elements including RAM, SRAM, DRAM, VRAM, Flash, hard disks, and/or other components and/or devices that may store at least one bit of data.

The vehicle 1500 may further include GNSS sensor(s) 1558. The GNSS sensor(s) 1558 (e.g., GPS, assisted GPS sensors, differential GPS (DGPS) sensors, etc.), to assist in mapping, perception, occupancy grid generation, and/or path planning functions. Any number of GNSS sensor(s) 1558 may be used, including, for example and without limitation, a GPS using a USB connector with an Ethernet to Serial (RS-232) bridge.

The vehicle 1500 may further include RADAR sensor(s) 1560. The RADAR sensor(s) 1560 may be used by the vehicle 1500 for long-range vehicle detection, even in darkness and/or severe weather conditions. RADAR functional safety levels may be ASIL B. The RADAR sensor(s) 1560 may use the CAN and/or the bus 1502 (e.g., to transmit data generated by the RADAR sensor(s) 1560) for control and to access object tracking data, with access to Ethernet to access raw data in some examples. A wide variety of RADAR sensor types may be used. For example, and without limitation, the RADAR sensor(s) 1560 may be suitable for front, rear, and side RADAR use. In some example, Pulse Doppler RADAR sensor(s) are used.

The RADAR sensor(s) 1560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1500 surroundings at higher speeds with minimal interference from traffic in adjacent lanes. The other two antennae may expand the field of view, making it possible to quickly detect vehicles entering or leaving the vehicle's 1500 lane.

Mid-range RADAR systems may include, as an example, a range of up to 1560 m (front) or 80 m (rear), and a field of view of up to 42 degrees (front) or 1550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1500 may further include ultrasonic sensor(s) 1562. The ultrasonic sensor(s) 1562, which may be positioned at the front, back, and/or the sides of the vehicle 1500, may be used for park assist and/or to create and update an occupancy grid. A wide variety of ultrasonic sensor(s) 1562 may be used, and different ultrasonic sensor(s) 1562 may be used for different ranges of detection (e.g., 2.5 m, 4 m). The ultrasonic sensor(s) 1562 may operate at functional safety levels of ASIL B.

The vehicle 1500 may include LIDAR sensor(s) 1564. The LIDAR sensor(s) 1564 may be used for object and pedestrian detection, emergency braking, collision avoidance, and/or other functions. The LIDAR sensor(s) 1564 may be functional safety level ASIL B. In some examples, the vehicle 1500 may include multiple LIDAR sensors 1564 (e.g., two, four, six, etc.) that may use Ethernet (e.g., to provide data to a Gigabit Ethernet switch).

In some examples, the LIDAR sensor(s) 1564 may be capable of providing a list of objects and their distances for a 360-degree field of view. Commercially available LIDAR sensor(s) 1564 may have an advertised range of approximately 1500 m, with an accuracy of 2 cm-3 cm, and with support for a 1500 Mbps Ethernet connection, for example. In some examples, one or more non-protruding LIDAR sensors 1564 may be used. In such examples, the LIDAR sensor(s) 1564 may be implemented as a small device that may be embedded into the front, rear, sides, and/or corners of the vehicle 1500. The LIDAR sensor(s) 1564, in such examples, may provide up to a 120-degree horizontal and 35-degree vertical field-of-view, with a 200 m range even for low-reflectivity objects. Front-mounted LIDAR sensor(s) 1564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1564 may be less susceptible to motion blur, vibration, and/or shock.

The vehicle may further include IMU sensor(s) 1566. The IMU sensor(s) 1566 may be located at a center of the rear axle of the vehicle 1500, in some examples. The IMU sensor(s) 1566 may include, for example and without limitation, an accelerometer(s), a magnetometer(s), a gyroscope(s), a magnetic compass(es), and/or other sensor types. In some examples, such as in six-axis applications, the IMU sensor(s) 1566 may include accelerometers and gyroscopes, while in nine-axis applications, the IMU sensor(s) 1566 may include accelerometers, gyroscopes, and magnetometers.

In some embodiments, the IMU sensor(s) 1566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1566 may enable the vehicle 1500 to estimate heading without requiring input from a magnetic sensor by directly observing and correlating the changes in velocity from GPS to the IMU sensor(s) 1566. In some examples, the IMU sensor(s) 1566 and the GNSS sensor(s) 1558 may be combined in a single integrated unit.

The vehicle may include microphone(s) 1596 placed in and/or around the vehicle 1500. The microphone(s) 1596 may be used for emergency vehicle detection and identification, among other things.

The vehicle may further include any number of camera types, including stereo camera(s) 1568, wide-view camera(s) 1570, infrared camera(s) 1572, surround camera(s) 1574, long-range and/or mid-range camera(s) 1598, and/or other camera types. The cameras may be used to capture image data around an entire periphery of the vehicle 1500. The types of cameras used depends on the embodiments and requirements for the vehicle 1500, and any combination of camera types may be used to provide the necessary coverage around the vehicle 1500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 15A and FIG. 15B.

The vehicle 1500 may further include vibration sensor(s) 1542. The vibration sensor(s) 1542 may measure vibrations of components of the vehicle, such as the axle(s). For example, changes in vibrations may indicate a change in road surfaces. In another example, when two or more vibration sensors 1542 are used, the differences between the vibrations may be used to determine friction or slippage of the road surface (e.g., when the difference in vibration is between a power-driven axle and a freely rotating axle).

The vehicle 1500 may include an ADAS system 1538. The ADAS system 1538 may include a SoC, in some examples. The ADAS system 1538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1560, LIDAR sensor(s) 1564, and/or a camera(s). The ACC systems may include longitudinal ACC and/or lateral ACC. Longitudinal ACC monitors and controls the distance to the vehicle immediately ahead of the vehicle 1500 and automatically adjust the vehicle speed to maintain a safe distance from vehicles ahead. Lateral ACC performs distance keeping, and advises the vehicle 1500 to change lanes when necessary. Lateral ACC is related to other ADAS applications such as LCA and CWS.

CACC uses information from other vehicles that may be received via the network interface 1524 and/or the wireless antenna(s) 1526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1500), while the I2V communication concept provides information about traffic further ahead. CACC systems may include either or both I2V and V2V information sources. Given the information of the vehicles ahead of the vehicle 1500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1500 if the vehicle 1500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1500 is backing up. Some RCTW systems include AEB to ensure that the vehicle brakes are applied to avoid a crash. RCTW systems may use one or more rear-facing RADAR sensor(s) 1560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1500, the vehicle 1500 itself must, in the case of conflicting results, decide whether to heed the result from a primary computer or a secondary computer (e.g., a first controller 1536 or a second controller 1536). For example, in some embodiments, the ADAS system 1538 may be a backup and/or secondary computer for providing perception information to a backup computer rationality module. The backup computer rationality monitor may run a redundant diverse software on hardware components to detect faults in perception and dynamic driving tasks. Outputs from the ADAS system 1538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1504.

In other examples, ADAS system 1538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1538 may be fed into the primary computer's perception block and/or the primary computer's dynamic driving task block. For example, if the ADAS system 1538 indicates a forward crash warning due to an object immediately ahead, the perception block may use this information when identifying objects. In other examples, the secondary computer may have its own neural network which is trained and thus reduces the risk of false positives, as described herein.

The vehicle 1500 may further include the infotainment SoC 1530 (e.g., an in-vehicle infotainment system (IVI)). Although illustrated and described as a SoC, the infotainment system may not be a SoC, and may include two or more discrete components. The infotainment SoC 1530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1500. For example, the infotainment SoC 1530 may radios, disk players, navigation systems, video players, USB and Bluetooth connectivity, carputers, in-car entertainment, Wi-Fi, steering wheel audio controls, hands free voice control, a heads-up display (HUD), an HMI display 1534, a telematics device, a control panel (e.g., for controlling and/or interacting with various components, features, and/or systems), and/or other components. The infotainment SoC 1530 may further be used to provide information (e.g., visual and/or audible) to a user(s) of the vehicle, such as information from the ADAS system 1538, autonomous driving information such as planned vehicle maneuvers, trajectories, surrounding environment information (e.g., intersection information, vehicle information, road information, etc.), and/or other information.

The infotainment SoC 1530 may include GPU functionality. The infotainment SoC 1530 may communicate over the bus 1502 (e.g., CAN bus, Ethernet, etc.) with other devices, systems, and/or components of the vehicle 1500. In some examples, the infotainment SoC 1530 may be coupled to a supervisory MCU such that the GPU of the infotainment system may perform some self-driving functions in the event that the primary controller(s) 1536 (e.g., the primary and/or backup computers of the vehicle 1500) fail. In such an example, the infotainment SoC 1530 may put the vehicle 1500 into a chauffeur to safe stop mode, as described herein.

The vehicle 1500 may further include an instrument cluster 1532 (e.g., a digital dash, an electronic instrument cluster, a digital instrument panel, etc.). The instrument cluster 1532 may include a controller and/or supercomputer (e.g., a discrete controller or supercomputer). The instrument cluster 1532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1530 and the instrument cluster 1532. In other words, the instrument cluster 1532 may be included as part of the infotainment SoC 1530, or vice versa.

Figure 15D:
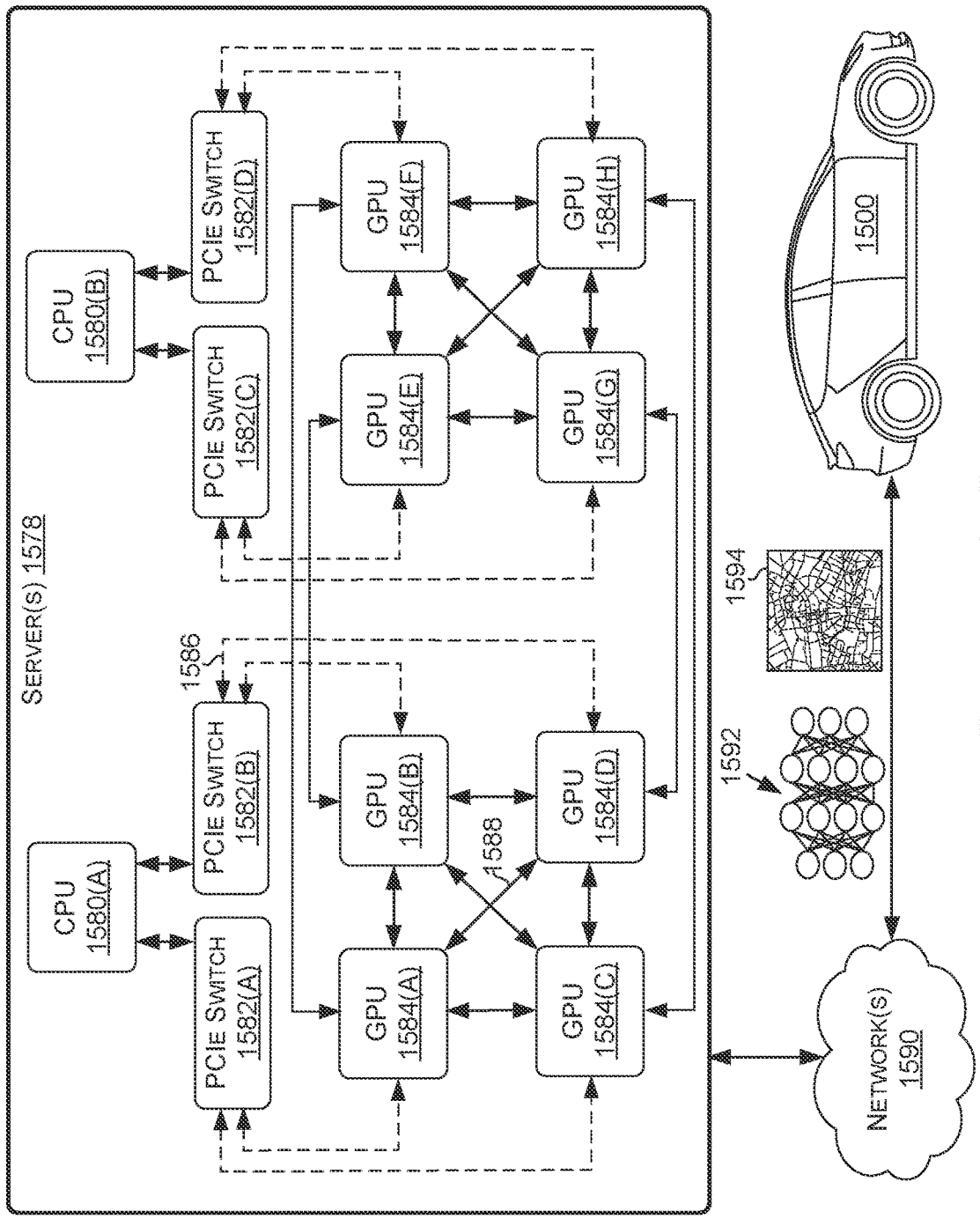
FIG. 15D is a system diagram for communication between cloud-based server(s) and the example autonomous vehicle of FIG. 15A, in accordance with some embodiments of the present disclosure.

FIG. 15D is a system diagram for communication between cloud-based server(s) and the example autonomous vehicle 1500 of FIG. 15A, in accordance with some embodiments of the present disclosure. The system 1576 may include server(s) 1578, network(s) 1590, and vehicles, including the vehicle 1500. The server(s) 1578 may include a plurality of GPUs 1584(A)-1584(H) (collectively referred to herein as GPUs 1584), PCIe switches 1582(A)-1582(H) (collectively referred to herein as PCIe switches 1582), and/or CPUs 1580(A)-1580(B) (collectively referred to herein as CPUs 1580). The GPUs 1584, the CPUs 1580, and the PCIe switches may be interconnected with high-speed interconnects such as, for example and without limitation, NVLink interfaces 1588 developed by NVIDIA and/or PCIe connections 1586. In some examples, the GPUs 1584 are connected via NVLink and/or NVSwitch SoC and the GPUs 1584 and the PCIe switches 1582 are connected via PCIe interconnects. Although eight GPUs 1584, two CPUs 1580, and two PCIe switches are illustrated, this is not intended to be limiting. Depending on the embodiment, each of the server(s) 1578 may include any number of GPUs 1584, CPUs 1580, and/or PCIe switches. For example, the server(s) 1578 may each include eight, sixteen, thirty-two, and/or more GPUs 1584.

The server(s) 1578 may receive, over the network(s) 1590 and from the vehicles, image data representative of images showing unexpected or changed road conditions, such as recently commenced road-work. The server(s) 1578 may transmit, over the network(s) 1590 and to the vehicles, neural networks 1592, updated neural networks 1592, and/or map information 1594, including information regarding traffic and road conditions. The updates to the map information 1594 may include updates for the HD map 1522, such as information regarding construction sites, potholes, detours, flooding, and/or other obstructions. In some examples, the neural networks 1592, the updated neural networks 1592, and/or the map information 1594 may have resulted from new training and/or experiences represented in data received from any number of vehicles in the environment, and/or based on training performed at a datacenter (e.g., using the server(s) 1578 and/or other servers).

The server(s) 1578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1590, and/or the machine learning models may be used by the server(s) 1578 to remotely monitor the vehicles.

In some examples, the server(s) 1578 may receive data from the vehicles and apply the data to up-to-date real-time neural networks for real-time intelligent inferencing. The server(s) 1578 may include deep-learning supercomputers and/or dedicated AI computers powered by GPU(s) 1584, such as a DGX and DGX Station machines developed by NVIDIA. However, in some examples, the server(s) 1578 may include deep learning infrastructure that use only CPU-powered datacenters.

The deep-learning infrastructure of the server(s) 1578 may be capable of fast, real-time inferencing, and may use that capability to evaluate and verify the health of the processors, software, and/or associated hardware in the vehicle 1500. For example, the deep-learning infrastructure may receive periodic updates from the vehicle 1500, such as a sequence of images and/or objects that the vehicle 1500 has located in that sequence of images (e.g., via computer vision and/or other machine learning object classification techniques). The deep-learning infrastructure may run its own neural network to identify the objects and compare them with the objects identified by the vehicle 1500 and, if the results do not match and the infrastructure concludes that the AI in the vehicle 1500 is malfunctioning, the server(s) 1578 may transmit a signal to the vehicle 1500 instructing a fail-safe computer of the vehicle 1500 to assume control, notify the passengers, and complete a safe parking maneuver.

For inferencing, the server(s) 1578 may include the GPU(s) 1584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 16:
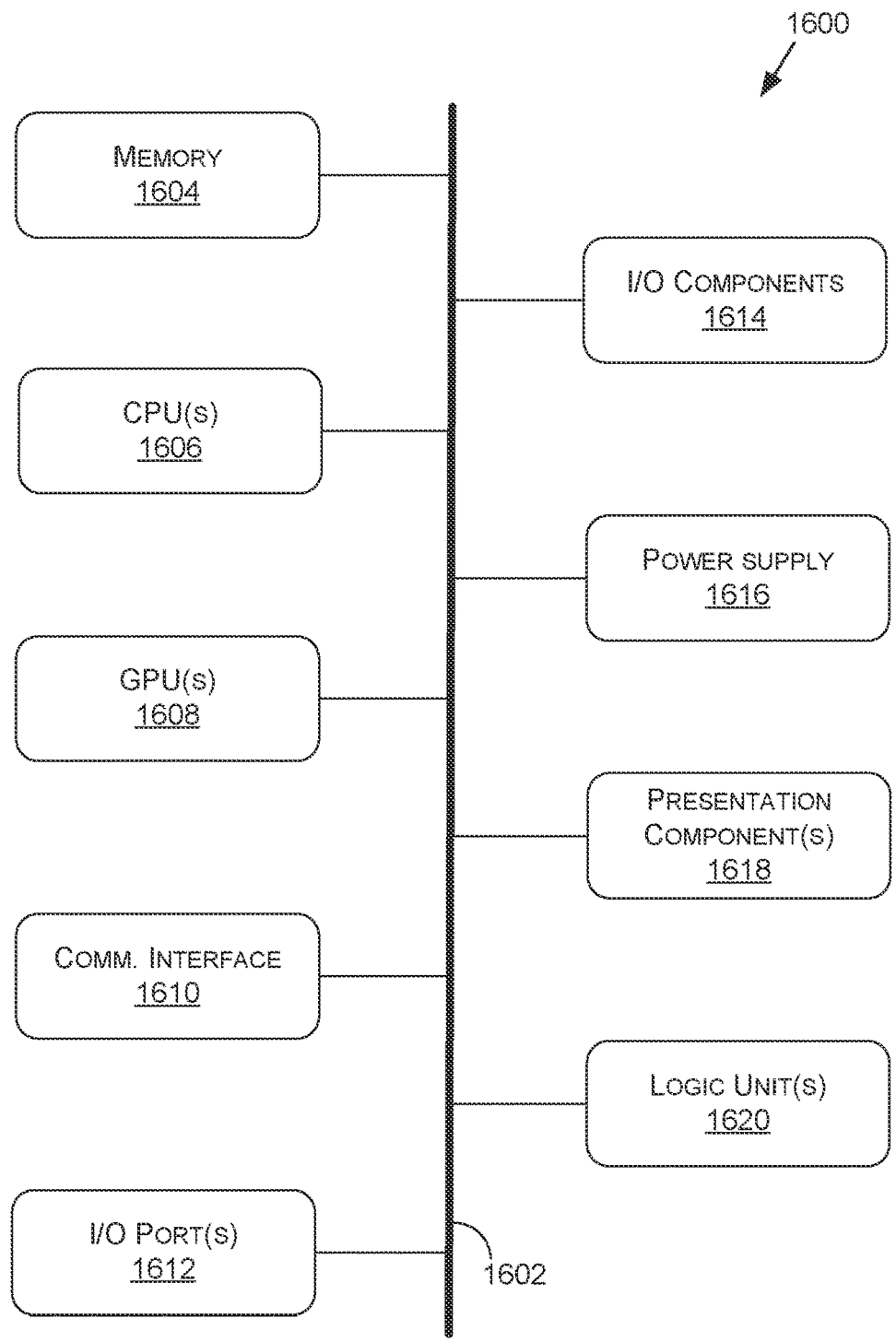
FIG. 16 is a block diagram of an example computing device suitable for use in implementing some embodiments of the present disclosure.

FIG. 16 is a block diagram of an example computing device(s) 1600 suitable for use in implementing some embodiments of the present disclosure. Computing device 1600 may include an interconnect system 1602 that directly or indirectly couples the following devices: memory 1604, one or more central processing units (CPUs) 1606, one or more graphics processing units (GPUs) 1608, a communication interface 1610, input/output (I/O) ports 1612, input/output components 1614, a power supply 1616, one or more presentation components 1618 (e.g., display(s)), and one or more logic units 1620. In at least one embodiment, the computing device(s) 1600 may comprise one or more virtual machines (VMs), and/or any of the components thereof may comprise virtual components (e.g., virtual hardware components). For non-limiting examples, one or more of the GPUs 1608 may comprise one or more vGPUs, one or more of the CPUs 1606 may comprise one or more vCPUs, and/or one or more of the logic units 1620 may comprise one or more virtual logic units. As such, a computing device(s) 1600 may include discrete components (e.g., a full GPU dedicated to the computing device 1600), virtual components (e.g., a portion of a GPU dedicated to the computing device 1600), or a combination thereof.

Although the various blocks of FIG. 16 are shown as connected via the interconnect system 1602 with lines, this is not intended to be limiting and is for clarity only. For example, in some embodiments, a presentation component 1618, such as a display device, may be considered an I/O component 1614 (e.g., if the display is a touch screen). As another example, the CPUs 1606 and/or GPUs 1608 may include memory (e.g., the memory 1604 may be representative of a storage device in addition to the memory of the GPUs 1608, the CPUs 1606, and/or other components). In other words, the computing device of FIG. 16 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 16.

The interconnect system 1602 may represent one or more links or busses, such as an address bus, a data bus, a control bus, or a combination thereof. The interconnect system 1602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1606 may be directly connected to the memory 1604. Further, the CPU 1606 may be directly connected to the GPU 1608. Where there is direct, or point-to-point connection between components, the interconnect system 1602 may include a PCIe link to carry out the connection. In these examples, a PCI bus need not be included in the computing device 1600.

The memory 1604 may include any of a variety of computer-readable media. The computer-readable media may be any available media that may be accessed by the computing device 1600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1606 may be configured to execute at least some of the computer-readable instructions to control one or more components of the computing device 1600 to perform one or more of the methods and/or processes described herein. The CPU(s) 1606 may each include one or more cores (e.g., one, two, four, eight, twenty-eight, seventy-two, etc.) that are capable of handling a multitude of software threads simultaneously. The CPU(s) 1606 may include any type of processor, and may include different types of processors depending on the type of computing device 1600 implemented (e.g., processors with fewer cores for mobile devices and processors with more cores for servers). For example, depending on the type of computing device 1600, the processor may be an Advanced RISC Machines (ARM) processor implemented using Reduced Instruction Set Computing (RISC) or an x86 processor implemented using Complex Instruction Set Computing (CISC). The computing device 1600 may include one or more CPUs 1606 in addition to one or more microprocessors or supplementary co-processors, such as math co-processors.

In addition to or alternatively from the CPU(s) 1606, the GPU(s) 1608 may be configured to execute at least some of the computer-readable instructions to control one or more components of the computing device 1600 to perform one or more of the methods and/or processes described herein. One or more of the GPU(s) 1608 may be an integrated GPU (e.g., with one or more of the CPU(s) 1606 and/or one or more of the GPU(s) 1608 may be a discrete GPU. In embodiments, one or more of the GPU(s) 1608 may be a coprocessor of one or more of the CPU(s) 1606. The GPU(s) 1608 may be used by the computing device 1600 to render graphics (e.g., 3D graphics) or perform general purpose computations. For example, the GPU(s) 1608 may be used for General-Purpose computing on GPUs (GPGPU). The GPU(s) 1608 may include hundreds or thousands of cores that are capable of handling hundreds or thousands of software threads simultaneously. The GPU(s) 1608 may generate pixel data for output images in response to rendering commands (e.g., rendering commands from the CPU(s) 1606 received via a host interface). The GPU(s) 1608 may include graphics memory, such as display memory, for storing pixel data or any other suitable data, such as GPGPU data. The display memory may be included as part of the memory 1604. The GPU(s) 1608 may include two or more GPUs operating in parallel (e.g., via a link). The link may directly connect the GPUs (e.g., using NVLINK) or may connect the GPUs through a switch (e.g., using NVSwitch). When combined together, each GPU 1608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1606 and/or the GPU(s) 1608, the logic unit(s) 1620 may be configured to execute at least some of the computer-readable instructions to control one or more components of the computing device 1600 to perform one or more of the methods and/or processes described herein. In embodiments, the CPU(s) 1606, the GPU(s) 1608, and/or the logic unit(s) 1620 may discretely or jointly perform any combination of the methods, processes and/or portions thereof. One or more of the logic units 1620 may be part of and/or integrated in one or more of the CPU(s) 1606 and/or the GPU(s) 1608 and/or one or more of the logic units 1620 may be discrete components or otherwise external to the CPU(s) 1606 and/or the GPU(s) 1608. In embodiments, one or more of the logic units 1620 may be a coprocessor of one or more of the CPU(s) 1606 and/or one or more of the GPU(s) 1608.

Examples of the logic unit(s) 1620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1610 may include one or more receivers, transmitters, and/or transceivers that enable the computing device 1600 to communicate with other computing devices via an electronic communication network, included wired and/or wireless communications. The communication interface 1610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1620 and/or communication interface 1610 may include one or more data processing units (DPUs) to transmit data received over a network and/or through interconnect system 1602 directly to (e.g., a memory of) one or more GPU(s) 1608.

The I/O ports 1612 may enable the computing device 1600 to be logically coupled to other devices including the I/O components 1614, the presentation component(s) 1618, and/or other components, some of which may be built in to (e.g., integrated in) the computing device 1600. Illustrative I/O components 1614 include a microphone, mouse, keyboard, joystick, game pad, game controller, satellite dish, scanner, printer, wireless device, etc. The I/O components 1614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1600. The computing device 1600 may be include depth cameras, such as stereoscopic camera systems, infrared camera systems, RGB camera systems, touchscreen technology, and combinations of these, for gesture detection and recognition. Additionally, the computing device 1600 may include accelerometers or gyroscopes (e.g., as part of an inertia measurement unit (IMU)) that enable detection of motion. In some examples, the output of the accelerometers or gyroscopes may be used by the computing device 1600 to render immersive augmented reality or virtual reality.

The power supply 1616 may include a hard-wired power supply, a battery power supply, or a combination thereof. The power supply 1616 may provide power to the computing device 1600 to enable the components of the computing device 1600 to operate.

The presentation component(s) 1618 may include a display (e.g., a monitor, a touch screen, a television screen, a heads-up-display (HUD), other display types, or a combination thereof), speakers, and/or other presentation components. The presentation component(s) 1618 may receive data from other components (e.g., the GPU(s) 1608, the CPU(s) 1606, DPUs, etc.), and output the data (e.g., as an image, video, sound, etc.).

Example Data Center

Figure 17:
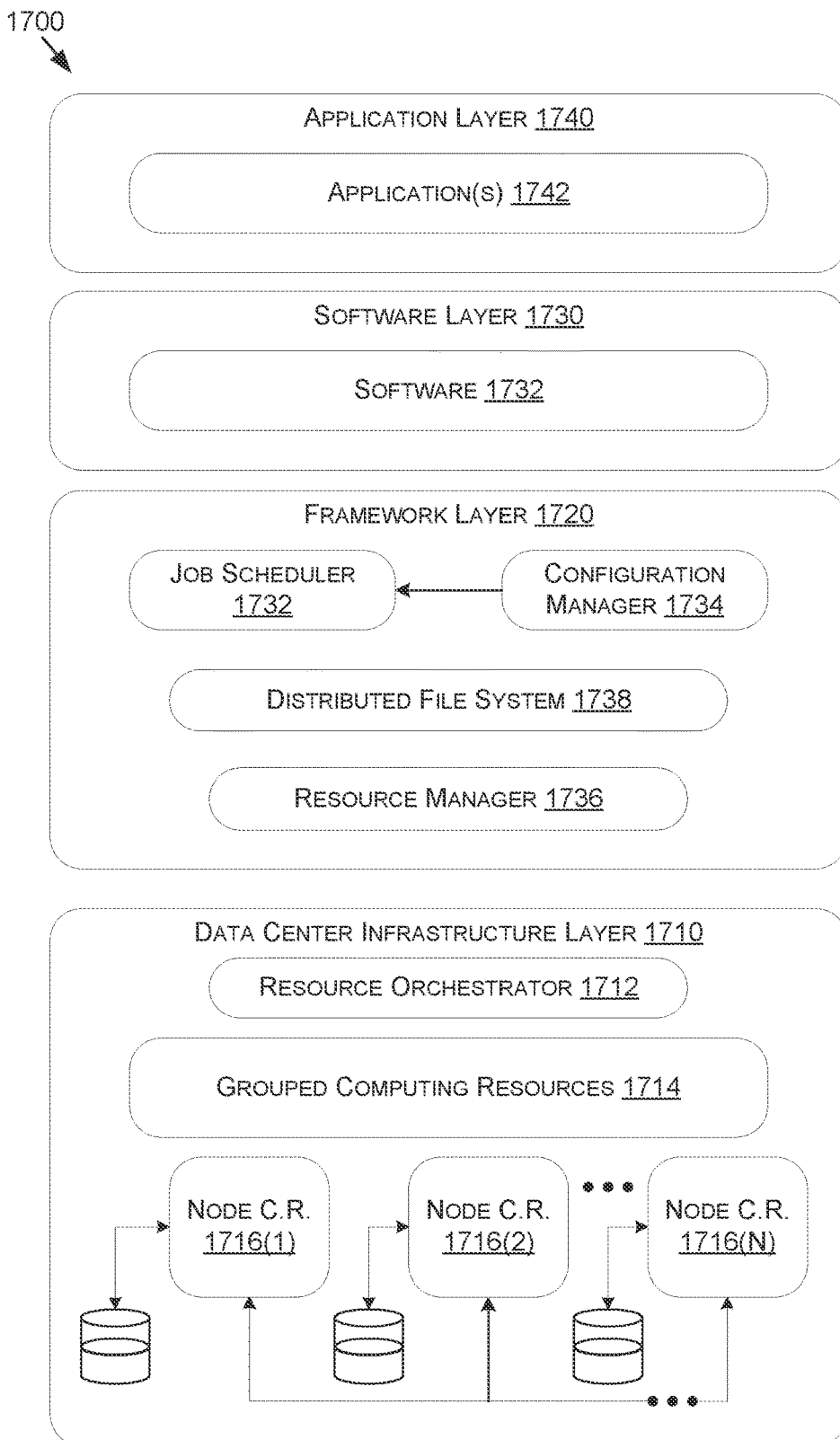
FIG. 17 is a block diagram of an example data center suitable for use in implementing some embodiments of the present disclosure.

FIG. 17 illustrates an example data center 1700 that may be used in at least one embodiments of the present disclosure. The data center 1700 may include a data center infrastructure layer 1710, a framework layer 1720, a software layer 1730, and/or an application layer 1740.

As shown in FIG. 17, the data center infrastructure layer 1710 may include a resource orchestrator 1712, grouped computing resources 1714, and node computing resources ("node C.R.s") 1716(1)-1716(N), where "N" represents any whole, positive integer. In at least one embodiment, node C.R.s 1716(1)-1716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1716(1)-1716(N) may correspond to a server having one or more of the above-mentioned computing resources. In addition, in some embodiments, the node C.R.s 1716(1)-17161(N) may include one or more virtual components, such as vGPUs, vCPUs, and/or the like, and/or one or more of the node C.R.s 1716(1)-1716(N) may correspond to a virtual machine (VM).

In at least one embodiment, grouped computing resources 1714 may include separate groupings of node C.R.s 1716 housed within one or more racks (not shown), or many racks housed in data centers at various geographical locations (also not shown). Separate groupings of node C.R.s 1716 within grouped computing resources 1714 may include grouped compute, network, memory or storage resources that may be configured or allocated to support one or more workloads. In at least one embodiment, several node C.R.s 1716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1712 may configure or otherwise control one or more node C.R.s 1716(1)-1716(N) and/or grouped computing resources 1714. In at least one embodiment, resource orchestrator 1712 may include a software design infrastructure (SDI) management entity for the data center 1700. The resource orchestrator 1712 may include hardware, software, or some combination thereof.

In at least one embodiment, as shown in FIG. 17, framework layer 1720 may include a job scheduler 1733, a configuration manager 1734, a resource manager 1736, and/or a distributed file system 1738. The framework layer 1720 may include a framework to support software 1732 of software layer 1730 and/or one or more application(s) 1742 of application layer 1740. The software 1732 or application(s) 1742 may respectively include web-based service software or applications, such as those provided by Amazon Web Services, Google Cloud and Microsoft Azure. The framework layer 1720 may be, but is not limited to, a type of free and open-source software web application framework such as Apache Spark™ (hereinafter "Spark") that may utilize distributed file system 1738 for large-scale data processing (e.g., "big data"). In at least one embodiment, job scheduler 1733 may include a Spark driver to facilitate scheduling of workloads supported by various layers of data center 1700. The configuration manager 1734 may be capable of configuring different layers such as software layer 1730 and framework layer 1720 including Spark and distributed file system 1738 for supporting large-scale data processing. The resource manager 1736 may be capable of managing clustered or grouped computing resources mapped to or allocated for support of distributed file system 1738 and job scheduler 1733. In at least one embodiment, clustered or grouped computing resources may include grouped computing resource 1714 at data center infrastructure layer 1710. The resource manager 1736 may coordinate with resource orchestrator 1712 to manage these mapped or allocated computing resources.

In at least one embodiment, software 1732 included in software layer 1730 may include software used by at least portions of node C.R.s 1716(1)-1716(N), grouped computing resources 1714, and/or distributed file system 1738 of framework layer 1720. One or more types of software may include, but are not limited to, Internet web page search software, e-mail virus scan software, database software, and streaming video content software.

In at least one embodiment, application(s) 1742 included in application layer 1740 may include one or more types of applications used by at least portions of node C.R.s 1716(1)-1716(N), grouped computing resources 1714, and/or distributed file system 1738 of framework layer 1720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1734, resource manager 1736, and resource orchestrator 1712 may implement any number and type of self-modifying actions based on any amount and type of data acquired in any technically feasible fashion. Self-modifying actions may relieve a data center operator of data center 1700 from making possibly bad configuration decisions and possibly avoiding underutilized and/or poor performing portions of a data center.

The data center 1700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1700. In at least one embodiment, trained or deployed machine learning models corresponding to one or more neural networks may be used to infer or predict information using resources described above with respect to the data center 1700 by using weight parameters calculated through one or more training techniques, such as but not limited to those described herein.

In at least one embodiment, the data center 1700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1600 of FIG. 16—e.g., each device may include similar components, features, and/or functionality of the computing device(s) 1600. In addition, where backend devices (e.g., servers, NAS, etc.) are implemented, the backend devices may be included as part of a data center 1700, an example of which is described in more detail herein with respect to FIG. 17.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1600 described herein with respect to FIG. 16. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising:
processing circuitry to:
generate a first fused output by applying learned fusion to first data generated using a first sensor processing pipeline and second data generated using a second sensor processing pipeline;
generate a second fused output by applying rule-based fusion to the first data, the second data, and the first fused output; and
perform one or more operations based at least on the second fused output,
wherein the first fused output is capable of compliance with a first automotive integrity safety level (ASIL) and the second fused output is capable of compliance with a second ASIL level, the second ASIL level being a higher ASIL level than the first ASIL level.

2. The one or more processors of claim 1, wherein:
the first sensor processing pipeline includes at least a first sensor and a first processing component that processes first sensor data obtained using the first sensor to compute a first intermediate output; and
the second sensor processing pipeline includes at least a second sensor and a second processing component that processes second sensor data obtained using the second sensor to compute a second intermediate output,
wherein at least one of the first data or the second data represents at least one of the first intermediate output or the second intermediate output.

3. The one or more processors of claim 2, wherein the first processing component and the second processing component include at least one of a learned processing component or a rule-based processing component.

4. The one or more processors of claim 3, wherein the learned processing component includes a deep neural network (DNN).

5. The one or more processors of claim 1, wherein the first data and the second data correspond to sensor data obtained using at least one of the first sensor processing pipeline or the second sensor processing pipeline.

6. The one or more processors of claim 1, wherein the first data and the second data correspond to one or more outputs of one or more processing components of at least one of the first sensor processing pipeline or the second sensor processing pipeline, the processing circuitry processing at least sensor data obtained using a respective sensor of the first sensor processing pipeline or the second sensor processing pipeline.

7. The one or more processors of claim 1, wherein the learned fusion corresponds to at least one of early learned sensor fusion or late learned sensor fusion.

8. The one or more processors of claim 1, wherein the first sensor processing pipeline and the second sensor processing pipeline are each capable of compliance with a lower ASIL level than the second ASIL level.

9. The one or more processors of claim 1, wherein the one or more processors are comprised in at least one of:
a control system for an autonomous or semi-autonomous machine;
a perception system for an autonomous or semi-autonomous machine;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

10. A sensor fusion architecture comprising:
a first sensor processing pipeline including at least a first sensor to obtain first sensor data and a first processing component to process the first sensor data to compute a first intermediate output;
a second sensor processing pipeline including at least a second sensor to obtain second sensor data and a second processing component to process the second sensor data to compute a second intermediate output;
a learned sensor fusion processing component to process data from the first sensor processing pipeline and the second sensor processing pipeline to generate a third intermediate output; and
a rule-based sensor fusion processing component to process the first intermediate output, the second intermediate output, and the third intermediate output to generate a fused output,
wherein the first intermediate output, the second intermediate output, and the third intermediate output correspond to one or more first safety levels lower than a second safety level corresponding to the fused output.

11. The sensor fusion architecture of claim 10, wherein the data from the first sensor processing pipeline and the second sensor processing pipeline includes the first sensor data and the second sensor data.

12. The sensor fusion architecture of claim 10, wherein the data from the first sensor processing pipeline and the second sensor processing pipeline includes data representative of the first intermediate output and the second intermediate output.

13. The sensor fusion architecture of claim 10, wherein the one or more first safety levels correspond to one or more first safety integrity levels and the second safety level corresponds to a safety integrity level.

14. The sensor fusion architecture of claim 10, wherein the first intermediate output and the second intermediate output further correspond to a first safety goal, the third intermediate output further corresponds to a second safety goal, and the fused output further corresponds to one of the first safety goal or the second safety goal.

15. The sensor fusion architecture of claim 10, wherein the fused output is used to perform one or more operations of a machine.

16. A system comprising:
one or more processors to:
generate a first fused output by applying learned fusion to first data generated using a first sensor processing pipeline and second data generated using a second sensor processing pipeline;
generate a second fused output by applying rule-based fusion to the first data, the second data, and the first fused output; and
perform one or more operations based at least on the second fused output, wherein the first fused output is capable of compliance with a first automotive integrity safety level (ASIL) and the second fused output is capable of compliance with a second ASIL level, the second ASIL level being a higher ASIL level than the first ASIL level.

17. The system of claim 16, wherein:
the first sensor processing pipeline includes at least a first sensor and a first processing component that processes first sensor data obtained using the first sensor to compute a first intermediate output; and
the second sensor processing pipeline includes at least a second sensor and a second processing component that processes second sensor data obtained using the second sensor to compute a second intermediate output,
wherein at least one of the first data or the second data represents at least one of the first intermediate output or the second intermediate output.

18. The system of claim 17, wherein the first processing component and the second processing component include at least one of a learned processing component or a rule-based processing component.

19. The system of claim 18, wherein the learned processing component includes a deep neural network (DNN).

20. The system of claim 16, wherein the first data and the second data correspond to sensor data obtained using at least one of the first sensor processing pipeline or the second sensor processing pipeline.

21. The system of claim 16, wherein the first data and the second data correspond to one or more outputs of one or more processing components of at least one of the first sensor processing pipeline or the second sensor processing pipeline, the one or more processing components processing at least sensor data obtained using a respective sensor of the first sensor processing pipeline or the second sensor processing pipeline.

22. The system of claim 16, wherein the learned fusion corresponds to at least one of early learned sensor fusion or late learned sensor fusion.

23. The system of claim 16, wherein the first sensor processing pipeline and the second sensor processing pipeline are each in compliance with a lower ASIL level than the second ASIL level.

24. The system of claim 16 wherein the system is comprised in at least one of:
a control system for an autonomous or semi-autonomous machine;
a perception system for an autonomous or semi-autonomous machine;
a system for performing simulation operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

25. A method comprising:
generating, based at least on a first sensor processing pipeline using a first processing component to process first sensor data obtained using a first sensor, a first intermediate output;
generating, based at least on a second sensor processing pipeline using a second processing component to process second sensor data obtained using a second sensor, a second intermediate output;
processing data from the first sensor processing pipeline and the second sensor processing pipeline to generate a third intermediate output; and
processing the first intermediate output, the second intermediate output, and the third intermediate output to generate a fused output,
wherein the first intermediate output, the second intermediate output, and the third intermediate output correspond to one or more first safety levels lower than a second safety level corresponding to the fused output.

26. The method of claim 25, wherein the data from the first sensor processing pipeline and the second sensor processing pipeline includes the first sensor data and the second sensor data.

27. The method of claim 25, wherein the data from the first sensor processing pipeline and the second sensor processing pipeline includes data representative of the first intermediate output and the second intermediate output.

28. The method of claim 25, wherein the one or more first safety levels correspond to one or more first safety integrity levels and the second safety level corresponds to a second safety integrity level.

29. The method of claim 25, wherein the first intermediate output and the second intermediate output correspond to a first safety goal, the third intermediate output corresponds to a second safety goal, and the fused output corresponds to one of the first safety goal or the second safety goal.

30. The sensor fusion architecture of claim 10, wherein the first sensor data and the second sensor data also correspond to the first ASIL.

31. The method of claim 25, wherein the processing the data from the first sensor processing pipeline and the second sensor processing pipeline uses a learned sensor fusion component.

32. The method of claim 25, wherein the processing the first intermediate output, the second intermediate output, and the third intermediate output uses a rule-based sensor fusion processing component.

33. The method of claim 25, wherein the first sensor data and the second sensor data also correspond to the one or more first safety integrity levels.

* * * * *